(12) United States Patent
Proctor, Jr. et al.

(10) Patent No.: US 11,995,685 B2
(45) Date of Patent: *May 28, 2024

(54) EFFICIENT AND SECURE COMMUNICATION USING WIRELESS SERVICE IDENTIFIERS

(71) Applicant: Proxicom Wireless LLC, Indialantic, FL (US)

(72) Inventors: James A. Proctor, Jr., Indialantic, FL (US); James Arthur Proctor, III, Indialantic, FL (US)

(73) Assignee: Proxicom Wireless LLC, Indialantic, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,528

(22) Filed: Jun. 1, 2023

(65) Prior Publication Data

US 2023/0325881 A1 Oct. 12, 2023

Related U.S. Application Data

(63) Continuation of application No. 17/942,197, filed on Sep. 12, 2022, now Pat. No. 11,687,971, which is a
(Continued)

(51) Int. Cl.
*H04W 84/12* (2009.01)
*G01S 1/68* (2006.01)
(Continued)

(52) U.S. Cl.
CPC ......... *G06Q 30/0261* (2013.01); *G06F 21/60* (2013.01); *G06Q 10/0875* (2013.01);
(Continued)

(58) Field of Classification Search
CPC ......... H04W 4/80; H04W 8/005; H04W 4/02; H04L 61/5038; H04L 67/306; H04L 61/6022
(Continued)

(56) References Cited

U.S. PATENT DOCUMENTS

| 5,121,126 A | 6/1992 | Clagett |
| 5,541,604 A | 7/1996 | Meier |

(Continued)

FOREIGN PATENT DOCUMENTS

| CA | 2506121 A1 | 4/1997 |
| CA | 2218268 A1 | 5/1998 |

(Continued)

OTHER PUBLICATIONS

Mandate dated Oct. 27, 2023, United States Court of Appeals, Federal Circuit, *Target Corporation v. Proxicom Wireless LLC*.
(Continued)

*Primary Examiner* — Khaled M Kassim
*Assistant Examiner* — Jason A Harley
(74) *Attorney, Agent, or Firm* — VLP Law Group, LLP; David J. Thibodeau, Jr.

(57) ABSTRACT

Systems and methods are provided for reducing communications between servers and a mobile device and providing enhanced security and privacy to wireless beacon services. This can involve a broadcast device transmitting a beacon transmission using a short range wireless radio, such a Bluetooth or WiFi, and including a MAC address, a first unique identifier, and a beacon service identifier. The mobile device then selects one or more unique identifiers from received beacon transmissions, by filtering (that is, selecting) those beacon transmissions which include the beacon service identifier. The wireless device then takes further action, if the first unique identifier is present among the
(Continued)

Broadcast and mobile device interaction selected one or more unique identifiers, using stored information from the server. The stored information may be delivered to the wireless device in response to the wireless device sending the first unique identifier to a server, or the stored information may have been previously downloaded.

87 Claims, 14 Drawing Sheets

Related U.S. Application Data continuation of application No. 17/366,826, filed on Jul. 2, 2021, now Pat. No. 11,443,344, which is a continuation of application No. 16/817,896, filed on Mar. 13, 2020, now Pat. No. 11,074,615, which is a continuation of application No. 15/271,410, filed on Sep. 21, 2016, now Pat. No. 11,334,918, which is a continuation of application No. 14/861,563, filed on Sep. 22, 2015, now abandoned, which is a continuation of application No. 14/472,477, filed on Aug. 29, 2014, now Pat. No. 9,161,164, which is a continuation of application No. 13/775,435, filed on Feb. 25, 2013, now Pat. No. 8,849,698, which is a continuation of application No. 13/212,723, filed on Aug. 18, 2011, now Pat. No. 8,385,896, which is a continuation of application No. 12/364,828, filed on Feb. 3, 2009, now Pat. No. 8,090,359.

(60) Provisional application No. 61/095,359, filed on Sep. 9, 2008, provisional application No. 61/095,001, filed on Sep. 8, 2008.

(51) Int. Cl.

| | | |
|---|---|---|
| *G06F 21/60* | (2013.01) | |
| *G06Q 10/0875* | (2023.01) | |
| *G06Q 20/20* | (2012.01) | |
| *G06Q 20/32* | (2012.01) | |
| *G06Q 20/38* | (2012.01) | |
| *G06Q 20/40* | (2012.01) | |
| *G06Q 30/0207* | (2023.01) | |
| *G06Q 30/0226* | (2023.01) | |
| *G06Q 30/0242* | (2023.01) | |
| *G06Q 30/0251* | (2023.01) | |
| *G06Q 30/0282* | (2023.01) | |
| *G06Q 30/0601* | (2023.01) | |
| *G06Q 50/00* | (2012.01) | |
| *H04B 5/00* | (2006.01) | |
| *H04L 9/40* | (2022.01) | |
| *H04L 67/306* | (2022.01) | |
| *H04L 67/52* | (2022.01) | |
| *H04L 67/54* | (2022.01) | |
| *H04L 69/18* | (2022.01) | |
| *H04W 4/00* | (2018.01) | |
| *H04W 4/02* | (2018.01) | |
| *H04W 4/029* | (2018.01) | |
| *H04W 4/21* | (2018.01) | |
| *H04W 4/80* | (2018.01) | |
| *H04W 8/00* | (2009.01) | |
| *H04W 8/26* | (2009.01) | |
| *H04W 12/02* | (2009.01) | |
| *H04W 12/04* | (2021.01) | |
| *H04W 12/06* | (2021.01) | |
| *H04W 76/11* | (2018.01) | |
| *H04W 88/18* | (2009.01) | |
| *H04L 61/5038* | (2022.01) | |
| *H04L 101/622* | (2022.01) | |
| *H04W 88/06* | (2009.01) | |

(52) U.S. Cl.
CPC ....... *G06Q 20/202* (2013.01); *G06Q 20/3224* (2013.01); *G06Q 20/3278* (2013.01); *G06Q 20/385* (2013.01); *G06Q 20/4016* (2013.01); *G06Q 30/0207* (2013.01); *G06Q 30/0222* (2013.01); *G06Q 30/0226* (2013.01); *G06Q 30/0242* (2013.01); *G06Q 30/0282* (2013.01); *G06Q 30/0601* (2013.01); *G06Q 30/0623* (2013.01); *G06Q 50/01* (2013.01); *H04L 63/20* (2013.01); *H04L 67/306* (2013.01); *H04L 67/52* (2022.05); *H04L 67/54* (2022.05); *H04L 69/18* (2013.01); *H04W 4/023* (2013.01); *H04W 4/029* (2018.02); *H04W 4/21* (2018.02); *H04W 4/80* (2018.02); *H04W 8/005* (2013.01); *H04W 8/26* (2013.01); *H04W 12/02* (2013.01); *H04W 12/04* (2013.01); *H04W 76/11* (2018.02); *H04L 61/5038* (2022.05); *H04L 2101/622* (2022.05); *H04W 88/06* (2013.01)

(58) Field of Classification Search
USPC ........................................ 370/329; 455/456.3
See application file for complete search history.

(56) References Cited

U.S. PATENT DOCUMENTS

| | | |
|---|---|---|
| 5,671,525 A | 9/1997 | Fidalgo |
| 5,690,773 A | 11/1997 | Fidalgo et al. |
| 5,745,037 A | 4/1998 | Guthrie et al. |
| 5,767,503 A | 6/1998 | Gloton |
| 5,804,803 A | 9/1998 | Cragun et al. |
| 5,815,811 A | 9/1998 | Pinard et al. |
| 5,901,303 A | 5/1999 | Chew |
| 5,977,877 A | 11/1999 | Mcculloch et al. |
| 5,987,011 A | 11/1999 | Toh |
| 6,002,918 A | 12/1999 | Heiman et al. |
| 6,043,747 A | 3/2000 | Altenhofen |
| 6,049,711 A | 4/2000 | Ben-Yehezkel et al. |
| 6,067,297 A | 5/2000 | Beach |
| 6,081,629 A | 6/2000 | Browning |
| 6,091,342 A | 7/2000 | Janesch et al. |
| 6,151,647 A | 11/2000 | Sarat |
| 6,163,771 A | 12/2000 | Walker et al. |
| 6,188,681 B1 | 2/2001 | Vesuna |
| 6,199,048 B1 | 3/2001 | Hudetz et al. |
| 6,233,565 B1 | 5/2001 | Lewis et al. |
| 6,236,674 B1 | 5/2001 | Morelli et al. |
| 6,259,898 B1 | 7/2001 | Lewis |
| 6,422,462 B1 | 7/2002 | Cohen |
| 6,439,345 B1 | 8/2002 | Recktenwald et al. |
| 6,446,208 B1 | 9/2002 | Gujar et al. |
| 6,487,540 B1 | 11/2002 | Smith et al. |
| 6,487,601 B1 | 11/2002 | Hubacher et al. |
| 6,493,550 B1 | 12/2002 | Raith |
| 6,553,006 B1 | 4/2003 | Kalliokulju et al. |
| 6,580,700 B1 | 6/2003 | Pinard et al. |
| 6,587,034 B1 | 7/2003 | Heiman et al. |
| 6,601,040 B1 | 7/2003 | Kolls |
| 6,615,804 B2 | 9/2003 | Matthews et al. |
| 6,616,049 B1 | 9/2003 | Barkan et al. |
| 6,629,149 B1 | 9/2003 | Fraser et al. |
| 6,675,017 B1 | 1/2004 | Zellner et al. |
| 6,675,153 B1 | 1/2004 | Cook et al. |
| 6,700,535 B2 | 3/2004 | Gilkes et al. |
| 6,712,274 B2 | 3/2004 | Dvorkis et al. |
| 6,715,681 B2 | 4/2004 | Dvorkis |
| 6,716,101 B1 | 4/2004 | Meadows et al. |
| 6,738,808 B1 | 5/2004 | Zellner et al. |
| 6,788,702 B1 | 9/2004 | Garcia-Luna-Aceves et al. |
| 6,791,997 B2 | 9/2004 | Beyer et al. |

(56) References Cited

U.S. PATENT DOCUMENTS

| | | |
|---|---|---|
| 6,799,049 B1 | 9/2004 | Zellner et al. |
| 6,837,436 B2 | 1/2005 | Swartz et al. |
| 6,845,338 B1 | 1/2005 | Willins et al. |
| 6,857,021 B1 | 2/2005 | Schuster et al. |
| 6,868,079 B1 | 3/2005 | Hunt |
| 6,901,270 B1 | 5/2005 | Beach |
| 6,909,399 B1 | 6/2005 | Zegelin et al. |
| 6,909,721 B2 | 6/2005 | Ekberg et al. |
| 6,929,149 B2 | 8/2005 | Selfridge et al. |
| 6,934,535 B2 | 8/2005 | Pyhaelammi |
| 6,965,914 B2 | 11/2005 | Dowling |
| 6,970,850 B1 | 11/2005 | Freeny, Jr. |
| 6,978,165 B2 | 12/2005 | Martinez et al. |
| 6,990,587 B2 | 1/2006 | Willins et al. |
| 6,993,049 B2 | 1/2006 | Davies |
| 7,003,283 B2 | 2/2006 | Hiltunen et al. |
| 7,005,968 B1 | 2/2006 | Bridgelall |
| 7,010,267 B2 | 3/2006 | Vanluijt et al. |
| 7,016,336 B2 | 3/2006 | Soerensen |
| 7,020,106 B2 | 3/2006 | Barnard et al. |
| 7,030,761 B2 | 4/2006 | Bridgelall et al. |
| 7,030,812 B2 | 4/2006 | Bekritsky et al. |
| 7,039,027 B2 | 5/2006 | Bridgelall |
| 7,039,358 B1 | 5/2006 | Shellhammer et al. |
| 7,065,559 B1 | 6/2006 | Weiss |
| 7,126,926 B1 | 10/2006 | Bjorklund et al. |
| 7,127,236 B2 | 10/2006 | Khan et al. |
| 7,142,120 B2 | 11/2006 | Charych et al. |
| 7,142,527 B2 | 11/2006 | Garcia-Luna-Aceves |
| 7,151,764 B1 | 12/2006 | Heinonen et al. |
| 7,156,311 B2 | 1/2007 | Attia et al. |
| 7,158,756 B2 | 1/2007 | Palin et al. |
| 7,167,487 B2 | 1/2007 | Herrmann |
| 7,173,922 B2 | 2/2007 | Beach |
| 7,173,923 B2 | 2/2007 | Beach |
| 7,174,031 B2 | 2/2007 | Rhoads et al. |
| 7,177,594 B2 | 2/2007 | Burr |
| 7,181,521 B2 | 2/2007 | Knauerhase et al. |
| 7,185,204 B2 | 2/2007 | Narayanaswami et al. |
| 7,194,438 B2 | 3/2007 | Sovio et al. |
| 7,197,326 B2 | 3/2007 | Acampora |
| 7,200,132 B2 | 4/2007 | Twitchell, Jr. |
| 7,206,820 B1 | 4/2007 | Rhoads et al. |
| 7,207,480 B1 | 4/2007 | Geddes |
| 7,209,468 B2 | 4/2007 | Twitchell, Jr. |
| 7,213,742 B1 | 5/2007 | Birch et al. |
| 7,213,743 B2 | 5/2007 | Carlson et al. |
| 7,221,668 B2 | 5/2007 | Twitchell, Jr. |
| 7,233,801 B2 | 6/2007 | Winn |
| 7,233,960 B1 | 6/2007 | Boris et al. |
| 7,245,602 B2 | 7/2007 | Skubic et al. |
| 7,246,149 B2 | 7/2007 | Dowling |
| 7,249,182 B1 | 7/2007 | Heinonen et al. |
| 7,254,406 B2 | 8/2007 | Beros et al. |
| 7,280,836 B2 | 10/2007 | Fuccello et al. |
| 7,280,847 B2 | 10/2007 | Goldthwaite et al. |
| 7,289,810 B2 | 10/2007 | Jagadeesan et al. |
| 7,302,256 B1 | 11/2007 | O'Hara et al. |
| 7,305,245 B2 | 12/2007 | Alizadeh-Shabdiz et al. |
| 7,313,120 B2 | 12/2007 | Ekberg et al. |
| 7,315,944 B2 | 1/2008 | Dutta et al. |
| 7,322,043 B2 | 1/2008 | Letsinger |
| 7,324,824 B2 | 1/2008 | Smith et al. |
| 7,324,957 B2 | 1/2008 | Boys |
| 7,327,701 B2 | 2/2008 | Fong |
| 7,330,112 B1 | 2/2008 | Emigh et al. |
| 7,339,909 B2 | 3/2008 | Kotzin |
| 7,340,438 B2 | 3/2008 | Nordman et al. |
| 7,340,439 B2 | 3/2008 | Burger et al. |
| 7,342,876 B2 | 3/2008 | Bellur et al. |
| 7,343,564 B2 | 3/2008 | Othmer |
| 7,346,341 B2 | 3/2008 | Costa-Requena et al. |
| 7,349,871 B2 | 3/2008 | Labrou et al. |
| 7,359,674 B2 | 4/2008 | Markki et al. |
| 7,363,494 B2 | 4/2008 | Brainard et al. |
| 7,376,433 B1 | 5/2008 | Hose |
| 7,379,920 B2 | 5/2008 | Leung et al. |
| 7,386,878 B2 | 6/2008 | Fernando et al. |
| 7,403,120 B2 | 7/2008 | Duron et al. |
| 7,403,762 B2 | 7/2008 | Morgan et al. |
| 7,412,246 B2 | 8/2008 | Lewis et al. |
| 7,414,988 B2 | 8/2008 | Jones et al. |
| 7,433,649 B2 | 10/2008 | Toulis et al. |
| 7,433,694 B2 | 10/2008 | Morgan et al. |
| 7,434,723 B1 | 10/2008 | White et al. |
| 7,436,831 B2 | 10/2008 | Miller et al. |
| 7,440,781 B2 | 10/2008 | Beach et al. |
| 7,471,954 B2 | 12/2008 | Brachet et al. |
| 7,492,254 B2 | 2/2009 | Bandy et al. |
| 7,502,933 B2 | 3/2009 | Jakobsson et al. |
| 7,509,131 B2 | 3/2009 | Krumm et al. |
| 7,515,914 B2 | 4/2009 | Herrod et al. |
| 7,522,058 B1 | 4/2009 | Light et al. |
| 7,545,784 B2 | 6/2009 | Mgrdechian et al. |
| 7,546,141 B2 | 6/2009 | Leon et al. |
| 7,580,699 B1 | 8/2009 | Shaw et al. |
| 7,590,246 B2 | 9/2009 | Calmels et al. |
| 7,616,124 B2 | 11/2009 | Paessel et al. |
| 7,620,026 B2 | 11/2009 | Anschutz et al. |
| 7,630,986 B1 | 12/2009 | Herz et al. |
| 7,647,024 B2 | 1/2010 | Wang et al. |
| 7,647,055 B2 | 1/2010 | Gum et al. |
| 7,661,132 B2 | 2/2010 | Ohkubo et al. |
| 7,702,108 B2 | 4/2010 | Amon et al. |
| 7,711,100 B2 | 5/2010 | Dennis |
| 7,711,620 B2 | 5/2010 | Abifaker |
| 7,714,712 B2 | 5/2010 | Emigh et al. |
| 7,716,484 B1 | 5/2010 | Kaliski, Jr. |
| 7,729,326 B2 | 6/2010 | Sekhar |
| 7,756,467 B2 | 7/2010 | Bent et al. |
| 7,768,415 B2 | 8/2010 | Blackadar |
| 7,773,995 B2 | 8/2010 | Rappaport et al. |
| 7,774,231 B2 | 8/2010 | Pond et al. |
| 7,775,430 B2 | 8/2010 | Lin |
| 7,822,000 B2 | 10/2010 | Sekhar |
| 7,826,425 B2 | 11/2010 | Sekhar |
| 7,836,512 B2 | 11/2010 | Mizuki et al. |
| 7,848,765 B2 | 12/2010 | Phillips et al. |
| 7,876,701 B2 | 1/2011 | Li et al. |
| 7,877,082 B2 | 1/2011 | Eagle et al. |
| 7,886,962 B2 | 2/2011 | Vawter |
| 7,904,952 B2 | 3/2011 | Yeap et al. |
| 7,936,736 B2 | 5/2011 | Proctor et al. |
| 7,942,337 B2 | 5/2011 | Jain |
| 7,952,481 B2 | 5/2011 | Shoarinejad et al. |
| 7,962,369 B2 | 6/2011 | Rosenberg |
| 7,963,441 B2 | 6/2011 | Emmons et al. |
| 7,965,983 B1 | 6/2011 | Swan et al. |
| 7,991,644 B2 | 8/2011 | Bryant et al. |
| 7,991,664 B1 | 8/2011 | Stone |
| 8,005,465 B2 | 8/2011 | Salokannel et al. |
| 8,014,755 B2 | 9/2011 | Sun et al. |
| 8,024,272 B2 | 9/2011 | Doran et al. |
| 8,073,795 B2 | 12/2011 | Honisch |
| 8,089,405 B2 | 1/2012 | Piersol et al. |
| 8,090,359 B2 | 1/2012 | Proctor et al. |
| 8,112,794 B2 | 2/2012 | Little et al. |
| 8,116,749 B2 | 2/2012 | Proctor et al. |
| 8,121,917 B2 | 2/2012 | Insolia et al. |
| 8,160,495 B2 | 4/2012 | Khedouri et al. |
| 8,185,133 B2 | 5/2012 | Billmaier et al. |
| 8,204,039 B2 | 6/2012 | Beach et al. |
| 8,205,240 B2 | 6/2012 | Ansari et al. |
| 8,229,458 B2 | 7/2012 | Busch |
| 8,233,841 B2 | 7/2012 | Griffin et al. |
| 8,254,338 B2 | 8/2012 | Anschutz et al. |
| 8,275,359 B2 | 9/2012 | Drennan |
| 8,295,819 B1 | 10/2012 | Kaplan et al. |
| 8,321,913 B2 | 11/2012 | Turnbull et al. |
| 8,332,521 B2 | 12/2012 | Chang et al. |
| 8,352,323 B2 | 1/2013 | Fisher |
| 8,364,171 B2 | 1/2013 | Busch |
| 8,369,842 B2 | 2/2013 | Proctor et al. |
| 8,374,592 B2 | 2/2013 | Proctor et al. |

(56) References Cited

U.S. PATENT DOCUMENTS

| | | |
|---|---|---|
| 8,385,896 B2 | 2/2013 | Proctor et al. |
| 8,385,913 B2 | 2/2013 | Proctor et al. |
| 8,478,300 B2 | 7/2013 | Kuehnel et al. |
| 8,543,500 B2 | 9/2013 | Ogilvy |
| 8,559,968 B2 | 10/2013 | Frank et al. |
| 8,576,846 B2 | 11/2013 | Kumar et al. |
| 8,599,814 B1 | 12/2013 | Vleugels et al. |
| 8,688,570 B2 | 4/2014 | Jones et al. |
| 8,780,945 B2 | 7/2014 | Gips et al. |
| 8,787,575 B2 | 7/2014 | Laaksonen et al. |
| 8,825,538 B2 | 9/2014 | Insolia et al. |
| 8,959,187 B2 | 2/2015 | Li et al. |
| 9,038,129 B2 | 5/2015 | Proctor et al. |
| 9,137,012 B2 | 9/2015 | Bailey et al. |
| 9,161,164 B2 | 10/2015 | Proctor et al. |
| 9,264,991 B1 | 2/2016 | Vleugels et al. |
| 9,373,091 B1 | 6/2016 | Belser et al. |
| 9,646,319 B2 | 5/2017 | Hammond et al. |
| 9,659,285 B2 | 5/2017 | Hunter et al. |
| 9,734,198 B2 | 8/2017 | Taylor |
| 9,805,347 B2 | 10/2017 | Hurry |
| 10,133,527 B2 | 11/2018 | Chang et al. |
| 10,140,072 B2 | 11/2018 | Chang et al. |
| 10,387,087 B2 | 8/2019 | Chang et al. |
| 10,489,096 B2 | 11/2019 | Chang et al. |
| 10,639,552 B2 | 5/2020 | Vock et al. |
| 10,642,576 B2 | 5/2020 | Chang et al. |
| 10,873,906 B2 | 12/2020 | Vleugels et al. |
| 11,012,934 B2 | 5/2021 | Vleugels et al. |
| 11,074,615 B2 | 7/2021 | Proctor et al. |
| 11,122,504 B1 | 9/2021 | Vleugels et al. |
| 11,252,659 B2 | 2/2022 | Vleugels et al. |
| 2001/0003191 A1 | 6/2001 | Kovacs et al. |
| 2001/0036200 A1 | 11/2001 | Nelson et al. |
| 2002/0032746 A1 | 3/2002 | Lazaridis |
| 2002/0061009 A1 | 5/2002 | Sorensen |
| 2002/0065720 A1 | 5/2002 | Carswell et al. |
| 2002/0073027 A1 | 6/2002 | Hui et al. |
| 2002/0077083 A1 | 6/2002 | Zellner et al. |
| 2002/0077118 A1 | 6/2002 | Zellner et al. |
| 2002/0101993 A1 | 8/2002 | Eskin |
| 2002/0123965 A1 | 9/2002 | Phillips |
| 2002/0128932 A1 | 9/2002 | Yung et al. |
| 2002/0131445 A1 | 9/2002 | Skubic et al. |
| 2002/0161666 A1 | 10/2002 | Fraki et al. |
| 2002/0188565 A1 | 12/2002 | Nakamura et al. |
| 2002/0188656 A1 | 12/2002 | Patton et al. |
| 2003/0021250 A1 | 1/2003 | Willins et al. |
| 2003/0028481 A1 | 2/2003 | Flitcroft et al. |
| 2003/0045272 A1 | 3/2003 | Burr |
| 2003/0053484 A1 | 3/2003 | Sorenson et al. |
| 2003/0074259 A1 | 4/2003 | Slyman et al. |
| 2003/0100328 A1 | 5/2003 | Klein et al. |
| 2003/0134650 A1 | 7/2003 | Sundar et al. |
| 2003/0149874 A1 | 8/2003 | Balfanz et al. |
| 2003/0158959 A1 | 8/2003 | Jayapalan et al. |
| 2003/0195808 A1 | 10/2003 | Brown et al. |
| 2003/0200140 A1 | 10/2003 | Hars |
| 2003/0200489 A1 | 10/2003 | Hars |
| 2003/0220835 A1 | 11/2003 | Barnes |
| 2003/0224787 A1 | 12/2003 | Gandolfo |
| 2004/0019564 A1 | 1/2004 | Goldthwaite et al. |
| 2004/0023640 A1 | 2/2004 | Ballai |
| 2004/0030601 A1 | 2/2004 | Pond et al. |
| 2004/0076136 A1 | 4/2004 | Beach |
| 2004/0082343 A1 | 4/2004 | Kim et al. |
| 2004/0093268 A1 | 5/2004 | Ramchandani et al. |
| 2004/0097243 A1 | 5/2004 | Zellner et al. |
| 2004/0137886 A1 | 7/2004 | Ross et al. |
| 2004/0167837 A1 | 8/2004 | Reel et al. |
| 2004/0186768 A1 | 9/2004 | Wakim et al. |
| 2004/0190468 A1 | 9/2004 | Saijonmaa |
| 2004/0203895 A1 | 10/2004 | Balasuriya |
| 2004/0205198 A1 | 10/2004 | Zellner et al. |
| 2004/0208151 A1 | 10/2004 | Haverinen et al. |
| 2004/0243519 A1 | 12/2004 | Perttila et al. |
| 2004/0245332 A1 | 12/2004 | Silverbrook et al. |
| 2004/0260608 A1 | 12/2004 | Lewis et al. |
| 2004/0264404 A1 | 12/2004 | Zegelin |
| 2004/0264466 A1 | 12/2004 | Huang |
| 2005/0038876 A1 | 2/2005 | Chaudhuri |
| 2005/0047385 A1 | 3/2005 | Otsuka |
| 2005/0054350 A1 | 3/2005 | Zegelin |
| 2005/0068928 A1* | 3/2005 | Smith ............... H04W 48/16 370/338 |
| 2005/0086211 A1 | 4/2005 | Mayer |
| 2005/0096031 A1 | 5/2005 | Sugaya et al. |
| 2005/0099291 A1 | 5/2005 | Landau |
| 2005/0113090 A1 | 5/2005 | Sharony |
| 2005/0114654 A1 | 5/2005 | Brackett et al. |
| 2005/0124359 A1 | 6/2005 | Willins et al. |
| 2005/0131837 A1 | 6/2005 | Sanctis et al. |
| 2005/0136845 A1 | 6/2005 | Masuoka et al. |
| 2005/0136891 A1 | 6/2005 | Wang et al. |
| 2005/0156026 A1 | 7/2005 | Ghosh et al. |
| 2005/0165667 A1 | 7/2005 | Cox |
| 2005/0174975 A1 | 8/2005 | Mgrdechian et al. |
| 2005/0180367 A1 | 8/2005 | Dooley et al. |
| 2005/0185615 A1 | 8/2005 | Zegelin |
| 2005/0187873 A1 | 8/2005 | Labrou et al. |
| 2005/0187959 A1* | 8/2005 | Jung ................... H04L 67/14 |
| 2005/0188062 A1 | 8/2005 | Li et al. |
| 2005/0213553 A1 | 9/2005 | Wang |
| 2005/0243737 A1 | 11/2005 | Dooley et al. |
| 2005/0243781 A1 | 11/2005 | Vesuna et al. |
| 2005/0250552 A1 | 11/2005 | Eagle et al. |
| 2005/0266868 A1 | 12/2005 | Fuccello |
| 2005/0273440 A1 | 12/2005 | Ching |
| 2006/0003785 A1 | 1/2006 | Zatezalo |
| 2006/0022038 A1 | 2/2006 | Hewlin et al. |
| 2006/0029024 A1 | 2/2006 | Zeng et al. |
| 2006/0030335 A1 | 2/2006 | Zellner et al. |
| 2006/0032901 A1 | 2/2006 | Sugiyama et al. |
| 2006/0045042 A1 | 3/2006 | Sethi et al. |
| 2006/0046709 A1 | 3/2006 | Krumm et al. |
| 2006/0047835 A1 | 3/2006 | Greaux |
| 2006/0050728 A1 | 3/2006 | Sung et al. |
| 2006/0069922 A1 | 3/2006 | Jelinek et al. |
| 2006/0079284 A1 | 4/2006 | Lu et al. |
| 2006/0085419 A1 | 4/2006 | Rosen |
| 2006/0089134 A1 | 4/2006 | Moton et al. |
| 2006/0089876 A1 | 4/2006 | Boys |
| 2006/0094447 A1 | 5/2006 | Zellner |
| 2006/0095348 A1 | 5/2006 | Jones et al. |
| 2006/0095349 A1 | 5/2006 | Morgan et al. |
| 2006/0099966 A1 | 5/2006 | Moton et al. |
| 2006/0104200 A1 | 5/2006 | Park |
| 2006/0104243 A1 | 5/2006 | Park |
| 2006/0106850 A1 | 5/2006 | Morgan et al. |
| 2006/0111045 A1 | 5/2006 | Orlassino et al. |
| 2006/0114104 A1 | 6/2006 | Scaramozzino |
| 2006/0116160 A1 | 6/2006 | Fuccello |
| 2006/0125631 A1 | 6/2006 | Sharony |
| 2006/0141932 A1 | 6/2006 | Lawrence et al. |
| 2006/0153085 A1 | 7/2006 | Willins et al. |
| 2006/0171341 A1 | 8/2006 | Wang et al. |
| 2006/0193258 A1 | 8/2006 | Ballai |
| 2006/0200843 A1 | 9/2006 | Morgan et al. |
| 2006/0217131 A1 | 9/2006 | Alizadeh-Shabdiz et al. |
| 2006/0229058 A1 | 10/2006 | Rosenberg |
| 2006/0234631 A1 | 10/2006 | Dieguez |
| 2006/0240840 A1 | 10/2006 | Morgan et al. |
| 2006/0245373 A1 | 11/2006 | Bajic |
| 2006/0245393 A1 | 11/2006 | Bajic |
| 2006/0245404 A1 | 11/2006 | Bajic |
| 2006/0264212 A1 | 11/2006 | Sekhar |
| 2006/0268746 A1 | 11/2006 | Wijting et al. |
| 2006/0268765 A1 | 11/2006 | Bajic |
| 2006/0268834 A1 | 11/2006 | Bajic |
| 2006/0270412 A1 | 11/2006 | Willins et al. |
| 2006/0282738 A1 | 12/2006 | Sohn et al. |
| 2006/0287813 A1 | 12/2006 | Quigley |
| 2007/0001904 A1 | 1/2007 | Mendelson |
| 2007/0002833 A1 | 1/2007 | Bajic |

(56) References Cited

U.S. PATENT DOCUMENTS

| | | |
|---|---|---|
| 2007/0004427 A1 | 1/2007 | Morgan et al. |
| 2007/0004428 A1 | 1/2007 | Morgan et al. |
| 2007/0010278 A1 | 1/2007 | D'Agostino et al. |
| 2007/0015549 A1 | 1/2007 | Hernandez et al. |
| 2007/0025287 A1 | 2/2007 | Goren et al. |
| 2007/0026818 A1 | 2/2007 | Willins et al. |
| 2007/0030824 A1 | 2/2007 | Ribaudo et al. |
| 2007/0032225 A1 | 2/2007 | Konicek et al. |
| 2007/0043828 A1* | 2/2007 | Famolari ............... H04L 51/214 709/219 |
| 2007/0049297 A1 | 3/2007 | Gopalan et al. |
| 2007/0050258 A1 | 3/2007 | Dohse |
| 2007/0060105 A1 | 3/2007 | Batta |
| 2007/0060117 A1 | 3/2007 | Fishman et al. |
| 2007/0060130 A1 | 3/2007 | Gogic et al. |
| 2007/0061487 A1 | 3/2007 | Moore et al. |
| 2007/0078851 A1 | 4/2007 | Grell et al. |
| 2007/0081503 A1 | 4/2007 | Mower |
| 2007/0091859 A1 | 4/2007 | Sethi et al. |
| 2007/0094084 A1 | 4/2007 | Rau et al. |
| 2007/0096909 A1 | 5/2007 | Lally |
| 2007/0100651 A1 | 5/2007 | Ramer et al. |
| 2007/0106612 A1 | 5/2007 | O'Brien et al. |
| 2007/0117576 A1 | 5/2007 | Huston |
| 2007/0118748 A1 | 5/2007 | Edney |
| 2007/0121534 A1 | 5/2007 | James et al. |
| 2007/0121550 A1 | 5/2007 | Wada |
| 2007/0133453 A1 | 6/2007 | Sethi et al. |
| 2007/0143348 A1 | 6/2007 | Rosenberg |
| 2007/0161382 A1 | 7/2007 | Melinger et al. |
| 2007/0173248 A1 | 7/2007 | Sekhar |
| 2007/0178886 A1 | 8/2007 | Wang et al. |
| 2007/0178907 A1 | 8/2007 | Gopalan et al. |
| 2007/0179792 A1 | 8/2007 | Kramer |
| 2007/0187491 A1 | 8/2007 | Godwin et al. |
| 2007/0190494 A1 | 8/2007 | Rosenberg |
| 2007/0201417 A1* | 8/2007 | Malik ................... H04W 84/12 370/338 |
| 2007/0204158 A1 | 8/2007 | Hatashita et al. |
| 2007/0211727 A1 | 9/2007 | Sethi et al. |
| 2007/0230441 A1 | 10/2007 | Sethi et al. |
| 2007/0233367 A1 | 10/2007 | Chen et al. |
| 2007/0237321 A1 | 10/2007 | Bloebaum et al. |
| 2007/0242643 A1 | 10/2007 | Chandra et al. |
| 2007/0242765 A1 | 10/2007 | Parizhisky et al. |
| 2007/0244633 A1 | 10/2007 | Phillips et al. |
| 2007/0244811 A1 | 10/2007 | Tumminaro |
| 2007/0255653 A1 | 11/2007 | Tumminaro et al. |
| 2007/0264968 A1 | 11/2007 | Frank et al. |
| 2007/0264991 A1 | 11/2007 | Jones et al. |
| 2007/0270099 A1 | 11/2007 | Le Gars |
| 2007/0280269 A1 | 12/2007 | Rosenberg |
| 2007/0281634 A1 | 12/2007 | Rao et al. |
| 2007/0286111 A1 | 12/2007 | Corson et al. |
| 2008/0002641 A1 | 1/2008 | Hong et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0009307 A1 | 1/2008 | Sekhar et al. |
| 2008/0010190 A1 | 1/2008 | Rackley et al. |
| 2008/0025282 A1 | 1/2008 | Hong |
| 2008/0036653 A1 | 2/2008 | Huston |
| 2008/0037487 A1 | 2/2008 | Li et al. |
| 2008/0039020 A1 | 2/2008 | Eskin |
| 2008/0045236 A1 | 2/2008 | Nahon et al. |
| 2008/0051033 A1 | 2/2008 | Hymes |
| 2008/0051059 A1 | 2/2008 | Fisher |
| 2008/0052109 A1 | 2/2008 | Boys |
| 2008/0056215 A1 | 3/2008 | Kopikare et al. |
| 2008/0070593 A1 | 3/2008 | Altman et al. |
| 2008/0071874 A1 | 3/2008 | Roodman et al. |
| 2008/0080397 A1 | 4/2008 | Niranjan et al. |
| 2008/0089519 A1 | 4/2008 | Ekberg |
| 2008/0097851 A1 | 4/2008 | Bemmel et al. |
| 2008/0097879 A1 | 4/2008 | Sadowski et al. |
| 2008/0099552 A1 | 5/2008 | Grillion |
| 2008/0102856 A1 | 5/2008 | Fortescue et al. |
| 2008/0104227 A1 | 5/2008 | Birnie et al. |
| 2008/0108308 A1 | 5/2008 | Ullah |
| 2008/0109302 A1 | 5/2008 | Salokannel et al. |
| 2008/0109741 A1 | 5/2008 | Messing et al. |
| 2008/0109843 A1 | 5/2008 | Ullah |
| 2008/0114647 A1 | 5/2008 | Singer et al. |
| 2008/0114699 A1 | 5/2008 | Yuan et al. |
| 2008/0114834 A1 | 5/2008 | Miyazaki |
| 2008/0119136 A1 | 5/2008 | Khazi |
| 2008/0132170 A1 | 6/2008 | Alizadeh-Shabdiz et al. |
| 2008/0132223 A1 | 6/2008 | Lin et al. |
| 2008/0132252 A1 | 6/2008 | Altman et al. |
| 2008/0133336 A1 | 6/2008 | Altman et al. |
| 2008/0133403 A1 | 6/2008 | Hamzeh |
| 2008/0134052 A1 | 6/2008 | Davis et al. |
| 2008/0136621 A1 | 6/2008 | Malik et al. |
| 2008/0136845 A1* | 6/2008 | Nakanishi ............ G09G 3/2025 345/690 |
| 2008/0139114 A1 | 6/2008 | Ranganathan |
| 2008/0139217 A1 | 6/2008 | Alizadeh-Shabdiz et al. |
| 2008/0140714 A1 | 6/2008 | Rhoads et al. |
| 2008/0167961 A1 | 7/2008 | Wentker et al. |
| 2008/0167988 A1 | 7/2008 | Sun et al. |
| 2008/0176583 A1 | 7/2008 | Brachet et al. |
| 2008/0177668 A1 | 7/2008 | Delean |
| 2008/0181154 A1 | 7/2008 | Sherman |
| 2008/0182591 A1 | 7/2008 | Krikorian |
| 2008/0182592 A1 | 7/2008 | Cha et al. |
| 2008/0188261 A1 | 8/2008 | Arnone |
| 2008/0189394 A1 | 8/2008 | Ross et al. |
| 2008/0195621 A1 | 8/2008 | Tedesco et al. |
| 2008/0205340 A1 | 8/2008 | Meylan et al. |
| 2008/0208762 A1 | 8/2008 | Arthur et al. |
| 2008/0214116 A1 | 9/2008 | Leung et al. |
| 2008/0214166 A1 | 9/2008 | Ramer et al. |
| 2008/0220746 A1 | 9/2008 | Ekberg |
| 2008/0222711 A1 | 9/2008 | Michaelis |
| 2008/0248815 A1 | 10/2008 | Busch |
| 2008/0249928 A1 | 10/2008 | Hill et al. |
| 2008/0255947 A1 | 10/2008 | Friedman |
| 2008/0261564 A1 | 10/2008 | Logan |
| 2008/0262928 A1 | 10/2008 | Michaelis |
| 2008/0288408 A1 | 11/2008 | Jacobsen |
| 2008/0301102 A1 | 12/2008 | Liang |
| 2008/0305738 A1 | 12/2008 | Khedouri et al. |
| 2008/0306825 A1 | 12/2008 | Schick et al. |
| 2008/0313079 A1 | 12/2008 | Van et al. |
| 2008/0313082 A1 | 12/2008 | Van et al. |
| 2009/0016248 A1 | 1/2009 | Li et al. |
| 2009/0016250 A1 | 1/2009 | Li et al. |
| 2009/0016255 A1 | 1/2009 | Park |
| 2009/0016315 A1 | 1/2009 | Laroia et al. |
| 2009/0016353 A1 | 1/2009 | Li et al. |
| 2009/0016524 A1 | 1/2009 | Park et al. |
| 2009/0019168 A1 | 1/2009 | Wu et al. |
| 2009/0022096 A1 | 1/2009 | Walley et al. |
| 2009/0037286 A1 | 2/2009 | Foster |
| 2009/0061901 A1 | 3/2009 | Arrasvuori et al. |
| 2009/0063624 A1 | 3/2009 | Nordstrom et al. |
| 2009/0085806 A1 | 4/2009 | Piersol et al. |
| 2009/0099961 A1 | 4/2009 | Ogilvy |
| 2009/0143104 A1 | 6/2009 | Loh et al. |
| 2009/0170559 A1 | 7/2009 | Phillips |
| 2009/0177530 A1 | 7/2009 | King et al. |
| 2009/0197681 A1 | 8/2009 | Krishnamoorthy et al. |
| 2009/0219132 A1 | 9/2009 | Maytal et al. |
| 2009/0234728 A1 | 9/2009 | Willuns et al. |
| 2009/0270120 A1 | 10/2009 | Park |
| 2009/0271211 A1 | 10/2009 | Hammad |
| 2009/0281904 A1 | 11/2009 | Pharris |
| 2009/0282130 A1 | 11/2009 | Antoniou et al. |
| 2009/0285119 A1 | 11/2009 | Horn et al. |
| 2009/0287827 A1 | 11/2009 | Horn et al. |
| 2009/0288012 A1 | 11/2009 | Hertel et al. |
| 2009/0291909 A1 | 11/2009 | Henderson et al. |

(56) References Cited

U.S. PATENT DOCUMENTS

| | | |
|---|---|---|
| 2009/0303250 A1 | 12/2009 | Phillips |
| 2009/0303926 A1 | 12/2009 | Den et al. |
| 2009/0307132 A1 | 12/2009 | Phillips |
| 2009/0307133 A1 | 12/2009 | Holloway et al. |
| 2009/0310517 A1 | 12/2009 | Narayanan et al. |
| 2009/0311963 A1 | 12/2009 | Haverty |
| 2009/0313105 A1 | 12/2009 | Magnusson |
| 2009/0323647 A1 | 12/2009 | Park et al. |
| 2009/0323648 A1 | 12/2009 | Park et al. |
| 2009/0325601 A1 | 12/2009 | Park et al. |
| 2010/0020746 A1 | 1/2010 | Zaks |
| 2010/0030638 A1 | 2/2010 | Davis et al. |
| 2010/0030651 A1 | 2/2010 | Matotek et al. |
| 2010/0041402 A1 | 2/2010 | Gallagher et al. |
| 2010/0049615 A1 | 2/2010 | Rose et al. |
| 2010/0051685 A1 | 3/2010 | Royyuru et al. |
| 2010/0062758 A1 | 3/2010 | Proctor et al. |
| 2010/0063867 A1 | 3/2010 | Proctor et al. |
| 2010/0096450 A1 | 4/2010 | Silverbrook et al. |
| 2010/0124196 A1 | 5/2010 | Bonar et al. |
| 2010/0138481 A1 | 6/2010 | Behrens |
| 2010/0141437 A1 | 6/2010 | Karam et al. |
| 2010/0201536 A1 | 8/2010 | Robertson et al. |
| 2010/0250673 A1 | 9/2010 | Laroia et al. |
| 2010/0274859 A1 | 10/2010 | Bucuk |
| 2010/0284447 A1 | 11/2010 | Gore et al. |
| 2011/0039592 A1 | 2/2011 | Haddad et al. |
| 2011/0119733 A1 | 5/2011 | Proctor et al. |
| 2012/0066043 A1 | 3/2012 | Carmichael et al. |
| 2012/0066199 A1 | 3/2012 | Ramer et al. |
| 2013/0217332 A1 | 8/2013 | Altman et al. |
| 2015/0200811 A1 | 7/2015 | Kasslin et al. |
| 2015/0249637 A1 | 9/2015 | Lawson-Brown et al. |
| 2015/0257104 A1 | 9/2015 | Choi et al. |
| 2015/0281939 A1 | 10/2015 | Li et al. |
| 2015/0296347 A1 | 10/2015 | Roth |
| 2016/0025837 A1 | 1/2016 | Hillier |
| 2016/0093184 A1 | 3/2016 | Locke et al. |
| 2017/0011425 A1 | 1/2017 | Proctor et al. |
| 2017/0131994 A1 | 5/2017 | Middleton et al. |
| 2019/0250239 A1 | 8/2019 | Samuelsson |

FOREIGN PATENT DOCUMENTS

| | | |
|---|---|---|
| CA | 2564287 A1 | 5/1998 |
| CA | 2235002 A1 | 12/1998 |
| CA | 2766024 A1 | 8/2002 |
| CA | 2766184 A1 | 8/2002 |
| CA | 2688189 A1 | 12/2008 |
| CN | 1759620 A | 4/2006 |
| CN | 101036061 A | 9/2007 |
| CN | 101233722 A | 7/2008 |
| EP | 0156856 A1 | 10/1985 |
| EP | 1098477 A1 | 5/2001 |
| EP | 1207654 A2 | 5/2002 |
| EP | 1296155 A1 | 3/2003 |
| EP | 2332126 A1 | 6/2011 |
| EP | 1908235 B1 | 1/2018 |
| FR | 2752347 A1 | 2/1998 |
| FR | 2798749 A1 | 3/2001 |
| JP | 2003-152739 A | 5/2003 |
| SE | 0702686 L | 6/2009 |
| SG | 134837 | 10/2007 |
| WO | 85/01373 A1 | 3/1985 |
| WO | 01/58098 A2 | 8/2001 |
| WO | 01/73575 A1 | 10/2001 |
| WO | 2007/047181 A2 | 4/2007 |
| WO | 2007/081356 A2 | 7/2007 |
| WO | 2007/084973 A2 | 7/2007 |
| WO | 2008/069446 A1 | 6/2008 |
| WO | 2009/050322 A1 | 4/2009 |
| WO | 2009/063272 A1 | 5/2009 |
| WO | 2010/028182 A1 | 3/2010 |

OTHER PUBLICATIONS

Judgment dated Sep. 20, 2023, Document 42, United States Court of Appeals, Federal Circuit, *Target Corporation* v. *Proxicom Wireless LLC*.

Judgment dated Sep. 20, 2023, Document 41, United States Court of Appeals, Federal Circuit, *Target Corporation* v. *Proxicom Wireless LLC*.

Order dated Dec. 4, 2020, Case No. IPR2020-00978, United States Patent trial & Appeal Board, *Target Corporation* v. *Proxicom Wireless LLC*.

Duflot, et al., "A Formal Analysis of Bluetooth Device Discovery", School of Computer Science, University of Birmingham, 1-16.

Feldmann, S., et al., "An indoor Bluetooth-based positioning system: concept, Implementation and experimental evaluation," Institute of Communications Engineering.

Fernandez, T., et al., "Bluetooth Sensor Network Positioning System with Dynamic Calibration," Dept. of Electronics & Systems, University of Coruna, Spain, IEEE 2007, pp. 45-49.

File History for U.S. Pat. No. 8,369,842.
File History for U.S. Pat. No. 8,370,955.
File History for U.S. Pat. No. 8,374,592.
File History for U.S. Pat. No. 8,385,896.
File History for U.S. Pat. No. 8,385,913.
File History for U.S. Pat. No. 8,849,698.
File History for U.S. Pat. No. 9,038,129.
File History for U.S. Pat. No. 9,161,164.
File History for U.S. Pat. No. 8,090,359.
File History of U.S. Appl. No. 60/814,254, filed Jun. 16, 2006, 44 pages.
File History of U.S. Pat. No. 7,936,736.
Final Office Action received for U.S. Appl. No. 17/366,826, dated Dec. 13, 2021, 42 pages.
Final Office Action; U.S. Appl. No. 12/364,819; dated Jun. 28, 2011.
Final Written Decision per 35 U.S.C. 138 dated Nov. 30, 2021, IPR2020-00934, U.S. Pat. No. 8,385,896 B2, *Target Corporation* v. *Proxicom Wireless, L.L.C.* (55 pages).
Final Written Decision per 35 U.S.C. 138 dated Nov. 30, 2021, IPR2020-00977, U.S. Pat. No. 8,369,842 B2, *Target Corporation* v. *Proxicom Wireless, L.L.C.* (45 pages).
Final Written Decision per 35 U.S.C. 138 dated Nov. 30, 2021, IPR2020-00979, U.S. Pat. No. 9,161,142 B2, *Target Corporation* v. *Proxicom Wireless, L.L.C.* (51 pages).
Final Written Decision per 35 U.S.C. 138 dated Nov. 30, 2021, IPR2020-00980, U.S. Pat. No. 8,385,913 B2, *Target Corporation* v. *Proxicom Wireless, L.L.C.* (47 pages).
Final Written Decision per 35 U.S.C. 138 dated Nov. 8, 2021, IPR2020-00904, U.S. Pat. No. 7,936,736 B2, *Target Corporation* v. *Proxicom Wireless, L.L.C.* (48 pages).
Final Written Decision per 35 U.S.C. 138 dated Nov. 8, 2021, IPR2020-00931, U.S. Pat. No. 8,090,359 B2, *Target Corporation* v. *Proxicom Wireless, L.L.C.* (51 pages).
Final Written Decision per 35 U.S.C. 138 dated Nov. 8, 2021, IPR2020-00932, U.S. Pat. No. 8,090,359 B2, *Target Corporation* v. *Proxicom Wireless, L.L.C.* (40 pages).
Final Written Decision per 35 U.S.C. 138 dated Nov. 8, 2021, IPR2020-00933, U.S. Pat. No. 8,374,592 B2, *Target Corporation* v. *Proxicom Wireless, L.L.C.* (38 pages).
Final Written Decision per 35 U.S.C. 138 dated Nov. 8, 2021, IPR2020-00903, U.S. Pat. No. 9,038,129 B2, *Target Corporation* v. *Proxicom Wireless, L.L.C.* (41 pages).
Gao et al., The Advanced Health and Disaster Aid Network: A Light-Weight Wireless Medical System for Triage, ArticlE in IEEE Transactions on Biomedical Circuits and Systems—Oct. 2007, 15 pages.
Gao, J., et al., "P2P Paid: A Peer-to-Peer Wireless Payment System," Proceedings of the 2005 Second IEEE International Workshop on Mobile Commerce and Services (WMCS05), 10 pp. (2005).
Giaglis, G., et al., "On the Potential Use of Mobile Positioning Technologies in Indoor Environments," 15th Bled eCommerce Conference eReality: Constructing the eEconomy, Bled, Slovenia, June 17-19-2002, 18 pp.

(56) References Cited

OTHER PUBLICATIONS

Golle et al. "Universal re-encryption for mixnets". In: Topics in Cryptology-CT-RSA 2004. Springer, 2004, pp. 163-178.

Hallberg, J., et al., "Positioning with Bluetooth," Lulea University of Technology, Dept. of Computer Science & Electrica Engineering, IEEE 2003.

Hari Balakrishnan, et al "Cricket Location System" "Cricket Presentation", 31 pages (2005).

Harrison, B. et al., "Bridging Physical and Virtual Worlds with Tagged Documents, Objects and Locations," Xerox PARC, CHI 99 May 1-20, 1999, pp. 29-30.

Heeger, David, "Signal Detection Theory Handout," University of Stanford, 1998, www.psych.stanford.edu/.about.lera/psych115s/notes/signal/, 7 pages.

Hochmair, H., "1 PDA-Assisted Indoor-Navigation with Imprecise Positioning: Results of a Desktop Usability Study," Dept. of Geography, St. Cloud State University.

Honkanen et al., "Low End Extension for Bluetooth," Radio and Wireless Conference, 2004 IEEE, pp. 199-202.

http://www.ietf.org/rfc/rfc4793.txt; The EAP Protected One-Time Password Protocol (EAP-POTP); 77 pages, Feb. 2007; retrieved from Internet Mar. 21, 2012.

http://www.smartcardalliance.org/resources/lib/Proximity.sub.--Mobile.sub.- --payments.sub.--200709.pdf; "Smart Card Alliance" 39 pages, Sep. 2007; retrieved from Internet Mar. 21, 2012.

Hunn, Nick, "EZURIO—An Introduction to Wibree" Nov. 2006, 7 pages.

Huomo et al., PowerPoint Presentation—Project: IEEE P802.15 Working Group for Wireless Personal Area Networks (WPANs), Submission Tille: [Nokia MAC Proposal for IEEE802.15 TG4], Jul. 2001, 50 pages.

IEEE Standard for Information Technology Part 11: Wireless Medium Access Control (MAC) and Physical Layer (PHY) Specifications, IEEE SID 802.11, (2007) 1232 pages.

IEEE Standard for Information Technology Part 15.4: Wireless Medium Access Control (MAC) and Physical Layer (PHY) Specifications for Low-Rate Wireless Personal Area Networks (LR-WPANs), IEEE Std 802.15.4, Oct. 1, 2003, 679 pages.

Iftode, L., et al., "Smart Phone: An Embedded System for Universal Interactions," Rutgers University Dept. of computer Sciences, pp. 1-12 (2004).

International Search Report and Written Opinion dated May 11, 2018 for Related PCT/US18/12277.

Ismail Guvenc, et al., Enhancements to RSS Based Indoor Tracking Systems Using Kalman Filters, Global Signal Processing Expo (2003).

Jakobsson et al., "Security Weaknesses in Bluetooth," D. Naccache (Ed.): CT-RSA 2001, LNCS 2020, 2001. c Springer-Verlag Berlin Heidelberg 2001, 16 pages.

James Bickers, A Giant of a Self-Service Rollout, Kiosk Marketplace (Nov. 28, 2005), https://www.kioskmarketplace.com/articles/a-giant-of-a-self-service-rollout-3/.

Joint Claim Construction Statement filed May 22, 2020 with the United States District Court, Middle District of Florida, Orlando Division.

Joint Claim Construction Statement, dated Jun. 15, 2020; Case No. IPR2020-00934, *Target Corporation* vs. *Proxicom Wireless, L.L.C.*; C.A. No. 6:19-cv-1886-RBD-LRH; pp. 1-6.

Joint Claim Construction Statement, dated Jun. 15, 2020; Case No. IPR2020-00977, *Target Corporation* vs. *Proxicom Wireless, L.L.C.*; C.A. No. 6:19-cv-1886-RBD-LRH; pp. 1-6.

Joint Claim Construction Statement, dated Jun. 15, 2020; Case No. IPR2020-00978, *Target Corporation* vs. *Proxicom Wireless, L.L.C.*; C.A. No. 6:19-cv-1886-RBD-LRH; pp. 1-6.

Order dated Dec. 4, 2020, Case No. IPR2020-00978, United States Patent trial & Appeal Board, *Target Corporation* vs. *Proxicom Wireless, L.L.C.*

Joint Claim Construction Statement, dated Jun. 15, 2020; Case No. IPR2020-00979, *Target Corporation* vs. *Proxicom Wireless, L.L.C.*; C.A. No. 6:19-cv-1886-RBD-LRH; pp. 1-6.

Joint Claim Construction Statement, dated Jun. 15, 2020; Case No. IPR2020-00980, *Target Corporation* vs. *Proxicom Wireless, L.L.C.*; C.A. No. 6:19-cv-1886-RBD-LRH; pp. 1-6.

Joint Claim Construction Statement, dated May 22, 2020; Case No. IPR2020-00903, *Target Corporation* vs. *Proxicom Wireless, L.L.C.*; C.A. No. 6:19-cv-1886-RBD-LRH; pp. 1-28.

Joint Claim Construction Statement, dated May 22, 2020; Case No. IPR2020-00904, *Target Corporation* vs. *Proxicom Wireless, L.L.C.*; C.A. No. 6:19-cv-1886-RBD-LRH; pp. 1-28.

Joint Claim Construction Statement, dated May 22, 2020; Case No. IPR2020-00931, *Target Corporation* vs. *Proxicom Wireless, L.L.C.*; C.A. No. 6:19-cv-1886-RBD-LRH; pp. 1-28.

Joint Claim Construction Statement, dated May 22, 2020; Case No. IPR2020-00932, *Target Corporation* vs. *Proxicom Wireless, L.L.C.*; C.A. No. 6:19-cv-1886-RBD-LRH; pp. 1-28.

Joint Claim Construction Statement, dated May 22, 2020; Case No. IPR2020-00933, *Target Corporation* vs. *Proxicom Wireless, L.L.C.*; C.A. No. 6:19-cv-1886-RBD-LRH; pp. 1-28.

Joint Claim Regarding Claim Construction Briefing Procedure, dated Jun. 15, 2020; Case No. IPR2020-00903, *Target Corporation* vs. *Proxicom Wireless, L.L.C.*; C.A. No. 6:19-cv-1886-RBD-LRH; pp. 1-6.

Joint Statement Regarding Claim Cnstruction Briefing Procedure, dated Jun. 15, 2020; Case No. IPR2020-00931, *Target Corporation* vs. *Proxicom Wireless, L.L.C.*; C.A. No. 6:19-cv-1886-RBD-LRH; pp. 1-28.

Joint Statement Regarding Claim Cnstruction Briefing Procedure, dated Jun. 15, 2020; Case No. IPR2020-00932, *Target Corporation* vs. *Proxicom Wireless, L.L.C.*; C.A. No. 6:19-cv-1886-RBD-LRH; pp. 1-28.

Joint Statement Regarding Claim Cnstruction Briefing Procedure, dated Jun. 15, 2020; Case No. IPR2020-00933, *Target Corporation* vs. *Proxicom Wireless, L.L.C.*; C.A. No. 6:19-cv-1886-RBD-LRH; pp. 1-6.

Joint Statement Regarding Claim Construction Briefing Procedure, dated Jun. 15, 2020; Case No. IPR2020-00904, *arget Corporation* vs. *Proxicom Wireless, L.L.C.*; C.A. No. 6:19-cv-1886-RBD-LRH; pp. 1-28.

Jonathan P. Munson & Vineet K. Gupta, Location-Based Notification as a General-Purpose Service, Proceedings of the 2nd International Workshop on Mobile Commerce (2002) 5 pages.

Josephson, W., et al., "Peer-to-Peer Authentication with a Distributed Single Sign-On Service," G.M. Voelker and S. Shenker (Eds.): IPTPS 2004, LNCS 3279, pp. 250-258, 2004.

Juels, Ari, "Minimalist Cryptography for Low-Cost RFID Tags" SCN'04 Proceedings of the 4th international conference on Security in Communication Networks, Springer-Verlag Berlin, Heidelberg (Copyrights)2005, 29 Pages.

Juels, et al., "Squealing Euros: Privacy Protection in RFID-Enabled Banknotes," 2003, 22 pages.

Jukka Reunamaki PowerPoint Presentation—Project: IEEE P802.15 Working Group for Wireless Personal Area Networks (WPANs), Submission Tille: [Nokia PHY submission to Task Group 4], Jul. 2001, 59 pages.

Kolodziej, K., et al., "In-Building Positioning: Modeling Location for Indoor World," Proceedings of the 15th Int'l Workshop on Database and Expert Systems Applications (DEXA'04), 5 (2004).

Kolodziej, K., et al., "Local Positioning Systems, LBS Applications and Services," Taylor & Francis Group LLC, 2006, 436.

Kortuem, G. et al., "Context-Aware, Adaptive Wearable Computers as Remote Interfaces to 'Intelligent' Environments" University of Oregon Computer Science Department (1998).

Krzysztof W. Kolodziej & Johan Hjelm, Local Positioning Systems (2006).

LaMarca, A., et al., "Place Lab: Device Positioning Using Radio Beacons in the Wild," Intel Corp., 2004.

Laudon, K. "E-commerce: Business, Technology, Society", Second Edition, (Pearson 2003).

Laudon, Kenneth C., et al., "E-commerce," Second Edition, Pearson, ISBN No. 0-321-20056-X, 2004.

Lee, T.O., et al., "An Agent-Based Micropayment System for E-commerce," J. Liu and Y. Ye (Eds.): E-commerce Agents, LNAI 2033, pp. 247-263, 2001.

(56) References Cited

OTHER PUBLICATIONS

Lim, H., et al., "Zero-Configuration, Robust Indoor Localization: Theory and Experimentation," University of Illinois Dept. of Computer Science, Technical Report No. UIUCDCS-R-2005-2629, Aug. 2005, p. 1-12.
Liu, H., et al., "Survey of Wireless Indoor Positioning Techniques and Systems," IEEE Transactions on Systems, Man, and Cybernetics—Part C: Applications and Reviews, vol. 37, No. 6, Nov. 2007, pp. 1067-1080.
Makela, Petteri, "Local Positioning Systems and Indoor Navigation," Licentiate of Science Thesis, Tampere University of Technology, pp. 116 (2008).
Marco, A., et al., "Location-based services for elderly and disabled people," ScienceDirect, Computer Communications 31 (2008), pp. 1055-1066.
Mettala, R., "Bluetooth Protocol Architecture", Bluetooth White Paper, Document No. 1.C.120/1.0, 3-20 (1999).
Molnar, David, Andrea Soppera, and David Wagner. "A scalable, delegatable pseudonym protocol enabling ownership transfer of RFID tags." International Workshop on Selected Areas in Cryptography. Springer Berlin Heidelberg, 2005, 15 pages.
Nissanka B. Priyantha, et al., Anchor-Free Distributed Localization in Sensor Networks, LCS Tech. Report #892 (2003).
Nissanka B. Priyantha, et al., Mobile-Assisted Localization in Wireless Sensor Networks, IEEE INFOCOM Conf. (Mar. 2005).
Non-Final Office Action received for U.S. Appl. No. 14/861,563, dated May 9, 2016, 16 pages.
Non-Final Office Action received for U.S. Appl. No. 16/817,896, dated Jun. 9, 2020, 22 pages.
Non-Final Office Action received for U.S. Appl. No. 16/817,896, dated Nov. 24, 2020, 34 pages.
Non-Final Office Action received for U.S. Appl. No. 16/817,896, dated Sep. 3, 2020, 23 pages.
Non-Final Office Action received for U.S. Appl. No. 17/366,826, dated Aug. 17, 2021, 40 pages.
Notice of Allowance dated Jul. 1, 2010 for U.S. Appl. No. 12/364,828.
Notice of Allowance received for U.S. Appl. No. 16/817,896, dated Jun. 8, 2021, 17 pages.
Notice of Allowance received for U.S. Appl. No. 16/817,896, dated Jun. 28, 2021, 4 pages.
Notice of Allowance received for U.S. Appl. No. 16/817,896, dated Mar. 19, 2021, 17 pages.
Notice of Allowance, U.S. Appl. No. 13/015,306 dated Nov. 8, 2012.
Notice of Allowance, U.S. Appl. No. 13/212,723 dated Jan. 16, 2013.
Office Action received in related U.S. Appl. No. 12/364,819, dated Aug. 26, 2010.
Office Action received in related U.S. Appl. No. 12/364,823, dated Jun. 16, 2010.
Office Action received in related U.S. Appl. No. 12/364,828, dated May 14, 2010.
Office Action received in related U.S. Appl. No. 12/364,938, dated May 13, 2010.
Office Action, U.S. Appl. No. 12/364,819, dated Apr. 16, 2012.
Office Action, U.S. Appl. No. 12/364,819, dated Nov. 15, 2010.
Petition for Inter Partes Review, dated May 15, 2020, Case No. IPR2020-00932, *Target Corporation* vs. *Proxicom Wireless, L.L.C.*
Petition for Inter Partes Review, dated May 15, 2020, Case No. IPR2020-00933, *Target Corporation* vs. *Proxicom Wireless, L.L.C.*
Petition for Inter Partes Review, dated May 27, 2020, Case No. IPR2020-00934, *Target Corporation* vs. *Proxicom Wireless, L.L.C.*
Petition for Inter Partes Review, dated May 27, 2020, Case No. IPR2020-00977, *Target Corporation* vs. *Proxicom Wireless, L.L.C.*
Petition for Inter Partes Review, dated May 8, 2020, Case No. IPR2020-00903, *Target Corporation* vs. *Proxicom Wireless, L.L.C.*
Petition for Inter Partes Review, dated May 8, 2020, Case No. IPR2020-00904, *Target Corporation* vs. *Proxicom Wireless, L.L.C.*
Petition for Inter Partes Review, dated Jun. 1, 2020, Case No. IPR2020-00978, *Target Corporation* vs. *Proxicom Wireless, L.L.C.*
Petition for Inter Partes Review, dated Jun. 1, 2020, Case No. IPR2020-00979, *Target Corporation* vs. *Proxicom Wireless, L.L.C.*
Petition for Inter Partes Review, dated Jun. 1, 2020, Case No. IPR2020-00980, *Target Corporation* vs. *Proxicom Wireless, L.L.C.*
Priyantha et al., "The Cricket Indoor Location System," Massachusetts Institute of Technology, pp. 1-199 (2005).
Priyantha, et al., "The Cricket Location-Support System," 6th ACM International Conference on Mobile Computing and Networking (ACM MOBICOM), Boston, MA, MIT Laboratory for Computer Science (2000).
U.S. Appl. No. 60/758,011, filed Jan. 11, 2006.
U.S. Appl. No. 60/758,012, filed Jan. 11, 2006.
Quiqley, A., et al., "BlueStar, a privacy centric location aware system," Telstra Research Laboratories, Melbourne, Australia, IEEE 2004, 6.
Roth, C.; Email dated Apr. 14, 2020 regarding Initial Identification of Disputed Claim Terms; *Target Corporation* vs. *Droxicom Wireless, L.L.C.*; C.A. No. 6:19-cv-1886-RBD-LRH; pp. 1-2.
Roth, C .; Email dated Apr. 14, 2020 regarding Initial Identification of Disputed Claim Terms; *Target Corporation* vs. *Proxicom Wireless, L.L.C.*; C.A. No. 6:19-cv-1886-RBD-LRH; pp. 1-2.
Rusli, E., "Gift card marketplace Cardpool Introduces Instand Redemption, Attracts Super Angels" [online], Sep. 7, 2010. Retrieved from the Internet URL: http://techcrunch.com/2010/09/07/gift-card-marketplace-cardpool-plasticju-ngle/, one page.
S. S. (Peter) Wang et al., E-911 Location Standards and Location Commercial Services, Nokia Research Center (2000) 5 pages.
Sarma et al., RFID Systems and Security and Privacy Implications, B.S. Kaliski Jr. et al. (Eds.): CHES 2002, LNCS 2523, 2003. c Springer-Verlag Berlin Heidelberg 2003, 16 pages.
Savvides, A., et al., "Chapter 15: Localization in Sensor Networks," pp. 327-349.
Schiller, Jochen, et al., "Location-Based Services," Elsevier, ISBN 9781493303786.
Shih et al., "Wake on Wireless: An Event Driven Energy Saving Strategy for Battery Operated Devices," MOBICOM '02 Sep. 23-26, 2002, Atlanta, Georgia, USA, Copyright 2002, 12 pages.
Shruthi et al., "Wibree Using Digital Radio Technology" International Journal of Advanced Trends in Computer Science and Engineering, vol. 3, No. 1, pp. 260-264 (2014), Special Issue of ICETETS 2014—Held on Feb. 24-25, 2014 in Malla Reddy Institute of Engineering and Technology, Secunderabad-14, AP, India.
Simple Pairing Whitepaper, Bluetooth Special Interest Group, V10r00, (2006).
Social Serendipity: Mobilizing Social Software, Eagle et al., Pervasive Computing, 1536-1268, pp. 28-34 (2005).
Specification of the Bluetooth System, Bluetooth Master Table of Contents & Compliance Requirements, Covered Core Package version: 2.1 + EDR (2007).
Specification vol. 0, Specification of the Bluetooth System, Wireless Connections Made Easy, Master Table of Contents & Compliance Requirements, Covered Core Package version 3.0 + HS, Current Master TOC, Apr. 21, 2009, 1712.
Srinivasan, T., et al., "HPRS: A Hybrid P2P Reputation System using File and Peer Rating," Third International Symposium on Information Assurance and Security, IEEE, pp. 307-312 (2007).
Subramanian, S., et al., "SBIL: Scalable Indoor Localization and Navigation Service," University of Tubingen Dept. of Computer Engineering, IEEE 2007, pp. 27-30.
Symbol Technologies, PDT 2800 Series, Product Reference Guide, pp. 1-36 (2001).
Symbol Technologies, PDT 6800 Series, Product Reference Guide, Revision A (2001).
Symbol Technologies, PDT 8100 Series, Product Reference Guide, pp. 1-48 (2001).
Symbol Technologies, Portable Shopping System: Integration Guide (2000); Wise Marketer Staff, Giant Foods Self-service Concept Store Opens (Oct. 12, 2005), https://thewisemarketer.com/headlines/giant-foods-self-service-concept-store-opens-4-2/.
Symbol Technologies, Wireless Networker LA-5033 PCT Adapter & LA-5030 PC Card, User Guide, pp. 1-72 (2004).
Target Corporation's Preliminary Invalidity Contentions dated Mar. 16, 2020, filed in *Proxicom Wireless LLC* v. *Target Corporation*,

(56) References Cited

OTHER PUBLICATIONS

U.S. District Court, Middle District of Florida, Orlando Division, C.A. No. 6:19-cv-1886-RBD-LRH.
Target's Initial Identification of Disputed Claim Terms; dated Apr. 10, 2020; Case No. IPR2020-00903, *Target Corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00904, *Target Corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00931, *Target Corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00932, *Target Corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00933, *Target Corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00934, *Target corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00977, *Target corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00978, *Target corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00979, *Target Corporation* vs. *Proxicom Wireless, L.L.C.*; C.A. No. 6:19-cv-1886-RBD-LRH; pp. 1-6.
Target's Initial Identification of Disputed Claim Terms; dated Apr. 10, 2020; Case No. IPR2020-00980, *Target Corporation* vs. *Proxicom Wireless, L.L.C.*; C.A. No. 6:19-cv-1886-RBD-LRH; pp. 1-6.
Thongthammachart, S., et al., "Bluetooth enables in-door mobile location services," In Proceedings of the 57th IEEE Semiannual Vehicular Technology Conference: VTC2003 (vol. 3, pp. Session 8H, paper 3) IEEE.
Transaction Receipt; PACER Service Center, dated Aug. 6, 2020, pp. 1-3.
Transcript of Telephonic Motion Hearing, dated Jun. 3, 2020; United States District Court, Middle District of Florida, Orlando Division; pp. 1-41; Case No. IPR2020-00903; *Target Corporation* vs. *Proxicom Wireless, L.L.C.*; C.A. No. 5:19-cv-1886-RBD-LRH; pp. 1-41.
Transcript of Telephonic Motion Hearing, dated Jun. 3, 2020; United States District Court, Middle District of Florida, Orlando Division; pp. 1-41; Case No. IPR2020-00904; *Target Corporation* vs. *Proxicom Wireless, L.L.C.*; C.A. No. 6:19-cv-1886-RBD-LRH; pp. 1-41.
U.S. Appl. No. 60/758,010, filed Jan. 11, 2006 by Rajiv Laroia for Methods and apparatus for facilitating identification, synchronization or acquisition using beacon signals, 30 pages.
U.S. Appl. No. 60/758,011, filed Jan. 11, 2006 by Rajiv Laroia for Methods and apparatus for using beacon signals for identification, synchronization or acquisition in an ad hoc wireless network, 26 pages.
U.S. Appl. No. 60/758,012, filed Jan. 11, 2006 by Rajiv Laroia for Methods and apparatus for using beacon signals in a cognitive radio network, 24 pages.
U.S. Appl. No. 60/845,051, filed Sep. 15, 2006 by Junyi Li for Beacons in a mixed wireless communication system, 30 pages.
U.S. Appl. No. 60/845,052, filed Sep. 15, 2006 by Aleksandar Jovicic for Beacons in a mixed wireless communication system, 29 pages.
U.S. Appl. No. 60/845,052, filed Sep. 15, 2006.
U.S. Appl. No. 60/863,304, filed Oct. 27, 2006 by Rajiv Laroia for Power Allocation Scheme, 15 pages.
U.S. Appl. No. 61/054,162, filed May 18, 2008 by Mark Braverman for System and Method for Electronic Payment.

U.S. Appl. No. 61/122,240, filed Dec. 12, 2008 by Rajiv Patel for System and Method for Electronic Payment.
Using Blouetooth, MC909X User Guide, Symbol Technologies, Inc., pp. 1-66 (2005).
Using MC9094 Phone, MC909X User Guide, Symbol Technologies, Inc., pp. 1-20 (2005).
Wang, et al., "Peer2Me - Rapid Application Framework for Mobile Peer-to-Peer Applications", Department of Compute and Information Science.
Wang, F., et al., "Bridging Physical and Virtual Worlds: Complex Event Processing for RFID Data Streams," University of California, Los Angeles Computer Science Department, Springer-Verlag Berlin Heidelberg 2006, pp. 588-607.
Want, R., et al., "Bridging Physical and Virtual Worlds with Electronic Tags," Xerox PARC, CHI '99 May 15-20, 1999, pp. 370-377.
Wauters, R., "TC50: Gift Card Auction Site Rackup Aims to Shake Up Market" [online], Sep. 14, 2009. Retrieved from the Internet URL: http://techcrunch.com/2009/09/14/tc50-gift-card-auction-site-rackup-aims-- to-shake-up-market/, one page.
WaveWorks Portable Shopping System Integration Guide, Integration Services Group, Pittsburgh, Pennsylvania, pp. 1-185.
Wei, G., et al., "HiPEC: A Hybrid P2P Model for Electronic Commerce," Zhejiang Gongshang University College of Computer & Information Engineering, pp. 1-5 (2008).
Weis et al. "Security and privacy aspects of low-cost radio frequency identification systems". In: Security in pervasive Computing. Springer, 201-212 (2004).
Weis et al., Security and Privacy Aspects of Low-Cost Radio Frequency Identification Systems, International Journal of Security and Networks, vol. 5 Issue 2/3, Mar. 2010, 12 pages.
Wg, Hid, "Device Identification Specification", V12r00, 1-20 (2006) Need Publication Details.
Yang, H., et al., "Indoor Localization Systems—Tracking objects and personnel with sensors, wireless networks and RFID," Measurement+ Control, vol. 42/1, Feb. 2009, pp. 18-23.
Zhang, Y., et al., "Progress in WWW Research and Development," 1oth Asia-PacificWeb Conference, APWeb 2008, Shenyang, China, Apr. 26-28, 2008 Proceedings, pp. 331-341.
Zhou, Y., et al., "A Map Registration Localization Approach based on Mobile Beacons for Wireless Sensor Networks," Communications Research Centre Canada, 2011 Crown, 5 pp.
Aalto, L., et al., "Bluetooth and WAP Push Based Location-Aware Mobile Advertising System," MobiSys '04, Jun. 6-9, 2004, Boston, MA, pp. 49-58.
Adam Smith, et al., Tracking Moving Devices with the Cricket Location System, 2nd USENIX/ACM MobiSys Conf. (Jun. 2004).
Adams, Richard. "www.advertising," Watson Guptill, ISBN 978-0823058617 (2003).
Amended Invalidity Contentions, dated Mar. 22, 2019, Case No. 6:16-cv-00064-RBK-GJK, *Proxicom Wireless, L.L.C.* v. *Macy's, Inc. and Macy's Florida Stores, LLC*.
Amendment in Response to Non-Final Office Action filed Jun. 3, 2008 for U.S. Appl. No. 11/055,310.
Aparicio, S., et al., "A Fusion Method Based on Bluetooth and WLAN Technologies for Indoor Location," Proceedings of IEEE Int'l Conference on Multisensor Fusion and Integration for Intelligent Systems Seoul, Korea, Aug. 20-22, 2008, pp. 487-491.
Ateniese et al., "Untraceable RFID Tags via Insubvertible Encryption", CCS'05, Nov. 7-11, 2005, Alexandria, Virginia, USA. Copyright 2005 ACM 1-59593-226-7/05/0011, 10 pages.
Bahl, P et al., "RADAR: An In-Building RF-based User Location and Tracking System," Microsoft Research.
Balakrishnan et al., "Lessons from Developing and Deploying the Cricket Indoor Location System," MIT Computer Science and Artificial Intelligence Laboratory, pp. 1-15 (2003).
Barahim, Z., et al., "Low-Cost Bluetooth Mobile Positioning for Location-based Application," University of Mauritius Computer Science & Engineering Dept., 4 pp.
Bargh, M., et al., "Indoor Localization Based on Response Rate of Bluetooth Inquiries," Melt '08, Sep. 19, 2008, San Francisco, CA, pp. 49-54.

(56) References Cited

OTHER PUBLICATIONS

Beacon-Stuffing: Wi-Fi Without Associations, Chandra et al., IEEE Computer Society, 1550-6193, pp. 53-57 (2007).
Bluetooth White Paper 1.1, AU-System, 1-25 (2000).
Brakman et al., "Formal model of the Bluetooth Inquiry Protocol", 1-13 (2006).
Case Study: "Agilysys Makes a Giant Leap Toward Wireless Shopping", CRN News (2005).
Chari, S., et al., "Security Issues in M-Commerce: A Usage-based Taxonomy," E-commerce Agents, LNAI 2033, pp. 264-282, 2001.
Chawathe, S., "Beacon Placement for Indoor Localization using Bluetooth," Proc. of the 119th Int'l IEEE Conference on Intelligent Transportation Systems, Beijing, China, Oct. 12-15, 2008, pp. 980-985.
Cricket v2 User Manual, Cricket Project, MIT Computer Science and Artificial Intelligence Lab Cambridge, MA (2005).
D Molnar, Privacy and Security in Library RFID Issues, Practices, and Architectures, Anonymized for submission, May 3, 2004, 19 pages.
D. Ramireddy PowerPoint Presentation—WIBREE Technology, Mar. 26, 2015, 21 pages.
Dan Alaimo, Giant Eagle to Test Self-Scanning, Supermarket News (Jun. 26, 2000), https://www.supermarketnews.com/print/26715.
Declaration of David Hilliard Williams in Support of Petition for Inter Partes Review of U.S. Pat. No. 7,936,736.
Declaration of David Hilliard Williams in Support of Petition for Inter Partes Review of U.S. Pat. No. 8,090,359.
Declaration of David Hilliard Williams in Support of Petition for Inter Partes Review of U.S. Pat. No. 8,116,749.
Declaration of David Hilliard Williams in Support of Petition for Inter Partes Review of U.S. Pat. No. 8,369,842.
Declaration of David Hilliard Williams in Support of Petition for Inter Partes Review of U.S. Pat. No. 8,385,896.
Declaration of David Hilliard Williams in Support of Petition for Inter Partes Review of U.S. Pat. No. 8,385,913.
Declaration of David Hilliard Williams in Support of Petition for Inter Partes Review of U.S. Pat. No. 9,038,129.
Declaration of David Hilliard Williams in Support of Petition for Inter Partes Review of U.S. Pat. No. 9,161,164.
Declaration of Sylvia Hall-Ellis, Ph.D in Support of Patent Owner's Preliminary Response; Case No. IPR2020-00979, *Target Corporation* vs. *Proxicom Wireless, L.L.C.*; pp. 1-66.
Defendant's Preliminary Constructions of Proposed Terms, dated May 14, 2020; Case No. IPR2020-00903, *Target Corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00904, *Target Corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00931, *Target Corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00932, *Target Corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00933, *Target Corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00934, *Target corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00977, *Target corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00978, *Target corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00979, *Target corporation* vs. *Proxicom Wireless, L.L.C.*; C.A. No. 6:19-cv-1886-RBD-LRH; pp. 1-28.
Defendant's Preliminary Constructions of Proposed Terms, dated May 14, 2020; Case No. IPR2020-00980, *Target Corporation* vs. *Proxicom Wireless, L.L.C.*; C.A. No. 6:19-cv-1886-RBD-LRH; pp. 1-28.
Defendant's Preliminary Constructions of Proposed Terms, dated May 8, 2020; Case No. IPR2020-00903, *Target Corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00904, *Target Corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00931, *Target Corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00932, *Target Corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00933, *Target Corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00934, *Target corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00977, *Target corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00978, *Target corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00979, *Target Corporation* vs. *Proxicom Wireless, L.L.C.*; C.A. No. 6:19-cv-1886-RBD-LRH; pp. 1-22.
Defendant's Preliminary Constructions of Proposed Terms, dated May 8, 2020; Case No. IPR2020-00980, *Target Corporation* vs. *Proxicom Wireless, L.L.C.*; C.A. No. 6:19-cv-1886-RBD-LRH; pp. 1-22.
Office Action, U.S. Appl. No. 12/364,823, dated Dec. 28, 2010.
Office Action, U.S. Appl. No. 12/364,828, dated May 14, 2010.
Office Action, U.S. Appl. No. 12/364,828, dated Sep. 15, 2010.
Office Action, U.S. Appl. No. 12/364,938, dated May 13, 2010.
Office Action, U.S. Appl. No. 12/364,938, dated Sep. 14, 2010.
Office Action, U.S. Appl. No. 13/015,306 dated Jul. 17, 2012.
Office Action, U.S. Appl. No. 13/015,306; dated Jan. 9, 2012.
Office Action, U.S. Appl. No. 13/212,766; dated Apr. 26, 2012.
Office Action, U.S. Appl. No. 13/213,028, dated May 5, 2012.
Office Action, U.S. Appl. No. 12/364,819, dated Aug. 26, 2010.
Office Action, U.S. Appl. No. 12/364,823, dated Jun. 16, 2010.
Office Action; U.S. Appl. No. 12/364,938; dated Jul. 21, 2011.
Office Action; U.S. Appl. No. 13/015,306; dated Jun. 17, 2011.
Ondrus, J., et al., "An Architecture for Mobile Payments and Couponing in the Retail Industry," 17th Bled eCommerce Conference eGlobal, Bled, Slovenia, Jun. 21-23, 2004, pp. 1-15.
Order dated Feb. 12, 2019, United States District Court Middle District of Florida Orlando Division.

(56) References Cited

OTHER PUBLICATIONS

Ortiz-Yepes, "Enhancing Authentication in eBanking with NFC enabled mobile phones"; Masters Thesis, Department of Mathematics and Computer Science, Eindhoven University of Technology; Aug. 11, 2008.
P370/470 Radio Scanner, Preliminary Symbol, Symbol Technologies, Inc., pp. 1-34 (1999).
Panos Kourouthanassis, et al., Grocery Supply-Chain Management: MyGROCER Innovative Business and echnology Framework, 17th Int'l Logistics Congress 264-73 (2001).
Panos Kourouthanassis, et al., Intelligent Cokes and Diapers: MyGROCER Ubiquitous Computing Environment, First Int'l Mobile Bus. Conf., 150-72 (2002).
Part 15.3: Wireless Medium Access Control (MAC) and Physical Layer (PHY) Specifications for High Rate Wireless Personal Area Networks (WPANs), IEEE Standards Board, Approved Jun. 12, 2003, The Institute of Electrical and Electronics Engineers, Inc. (New York); pp. 5, 25, 118 and 203.
Patent Owner Proxicom Wireless, LLC's Preliminary Response Pursuant to 37 C.F.R. 42.107; dated Aug. 13, 2020, Case No. IPR2020-00903, *Target Corporation* vs. *Proxicom Wireless, L.L.C.*; pp. 1-50.
Patent Owner Proxicom Wireless, LLC's Preliminary Response Pursuant to 37 C.F.R. 42.107; dated Aug. 13, 2020, Case No. IPR2020-00904, *Target Corporation* vs. *Proxicom Wireless, L.L.C.*; pp. 1-50.
Patent Owner Proxicom Wireless, LLC's Preliminary Response Pursuant to 37 C.F.R. 42.107; dated Aug. 13, 2020, Case No. IPR2020-00931, *Target Corporation* vs. *Proxicom Wireless, L.L.C.*; pp. 1-48.
Patent Owner Proxicom Wireless, LLC's Preliminary Response Pursuant to 37 C.F.R. 42.107; dated Aug. 19, 2020, Case No. IPR2020-00932, *Target Corporation* vs. *Proxicom Wireless, L.L.C.*; pp. 1-46.
Patent Owner Proxicom Wireless, LLC's Preliminary Response Pursuant to 37 C.F.R. 42.107; dated Aug. 19, 2020, Case No. IPR2020-00933, *Target Corporation* vs. *Proxicom Wireless, L.L.C.*; pp. 1-48.
Patent Owner Proxicom Wireless, LLC's Preliminary Response Pursuant to 37 C.F.R. 42.107; dated Sep. 8, 2020, Case No. IPR2020-00934, *Target Corporation* vs. *Proxicom Wireless, L.L.C.*; pp. 1-49.
Patent Owner Proxicom Wireless, LLC's Preliminary Response Pursuant to 37 C.F.R. 42.107; dated Sep. 8, 2020, Case No. IPR2020-00977, *Target Corporation* vs. *Proxicom Wireless, L.L.C.*; pp. 1-78.
Patent Owner Proxicom Wireless, LLC's Preliminary Response Pursuant to 37 C.F.R. 42.107; dated Sep. 8, 2020, Case No. IPR2020-00978, *Target Corporation* vs. *Proxicom Wireless, L.L.C.*; pp. 1-71.
Patent Owner Proxicom Wireless, LLC's Preliminary Response Pursuant to 37 C.F.R. 42.107; dated Sep. 8, 2020, Case No. IPR2020-00979, *Target Corporation* vs. *Proxicom Wireless, L.L.C.*; pp. 1-78.
Patent Owner Proxicom Wireless, LLC's Preliminary Response Pursuant to 37 C.F.R. 42.107; dated Sep. 8, 2020, Case No. IPR2020-00980, *Target Corporation* vs. *Proxicom Wireless, L.L.C.*; pp. 1-73.
Patro, R.J., "Localization in Wireless Sensor Network with Mobile Beacons," Honeywell Tech. Solution Lab, IEEE 2004, pp. 22-24.
Petition for Inter Partes Review, dated May 15, 2020, Case No. IPR2020-00931, *Target Corporation* vs. *Proxicom Wireless, L.L.C.*

\* cited by examiner

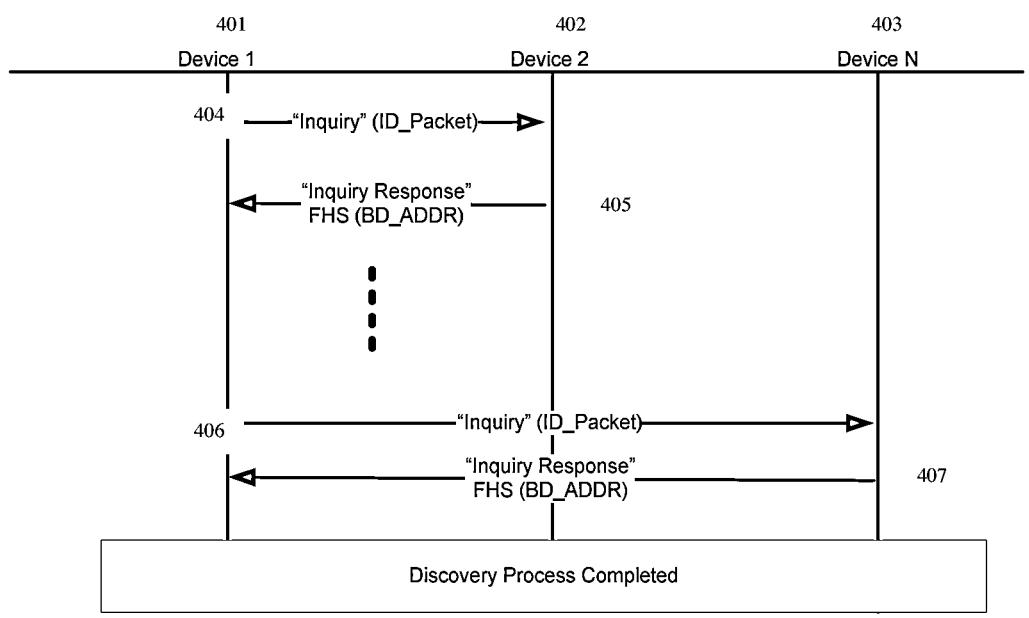
Figure 4 – 802.15.1-2002 (Bluetooth V1.2) Device Discovery

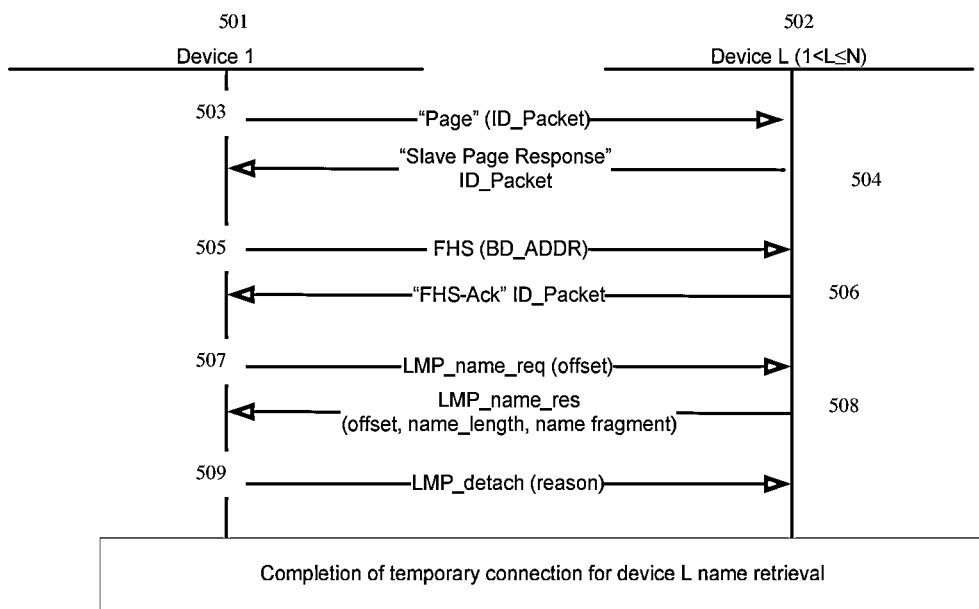
Figure 5 – 802.15.1-2002 (Bluetooth V1.2) Remote Name Request

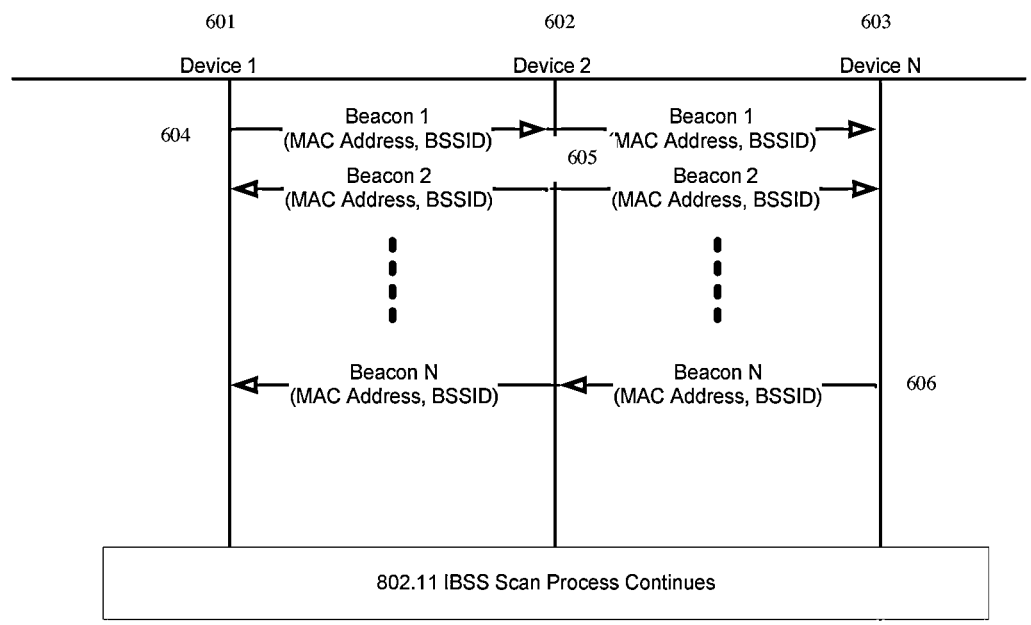
Figure 6 - 802.11 IBSS Beacon Process

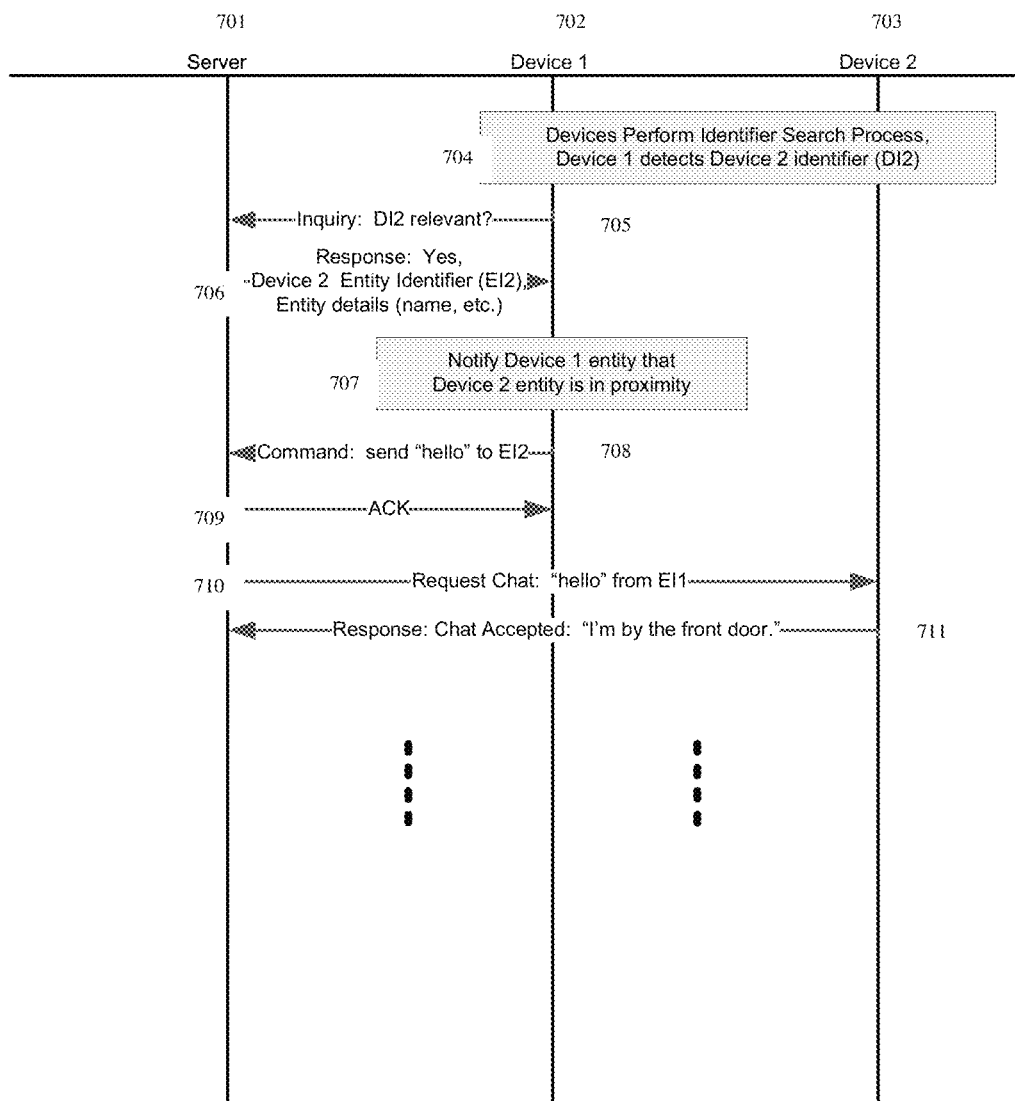
Figure 7 -- Process of Detection and entering a Chat Session

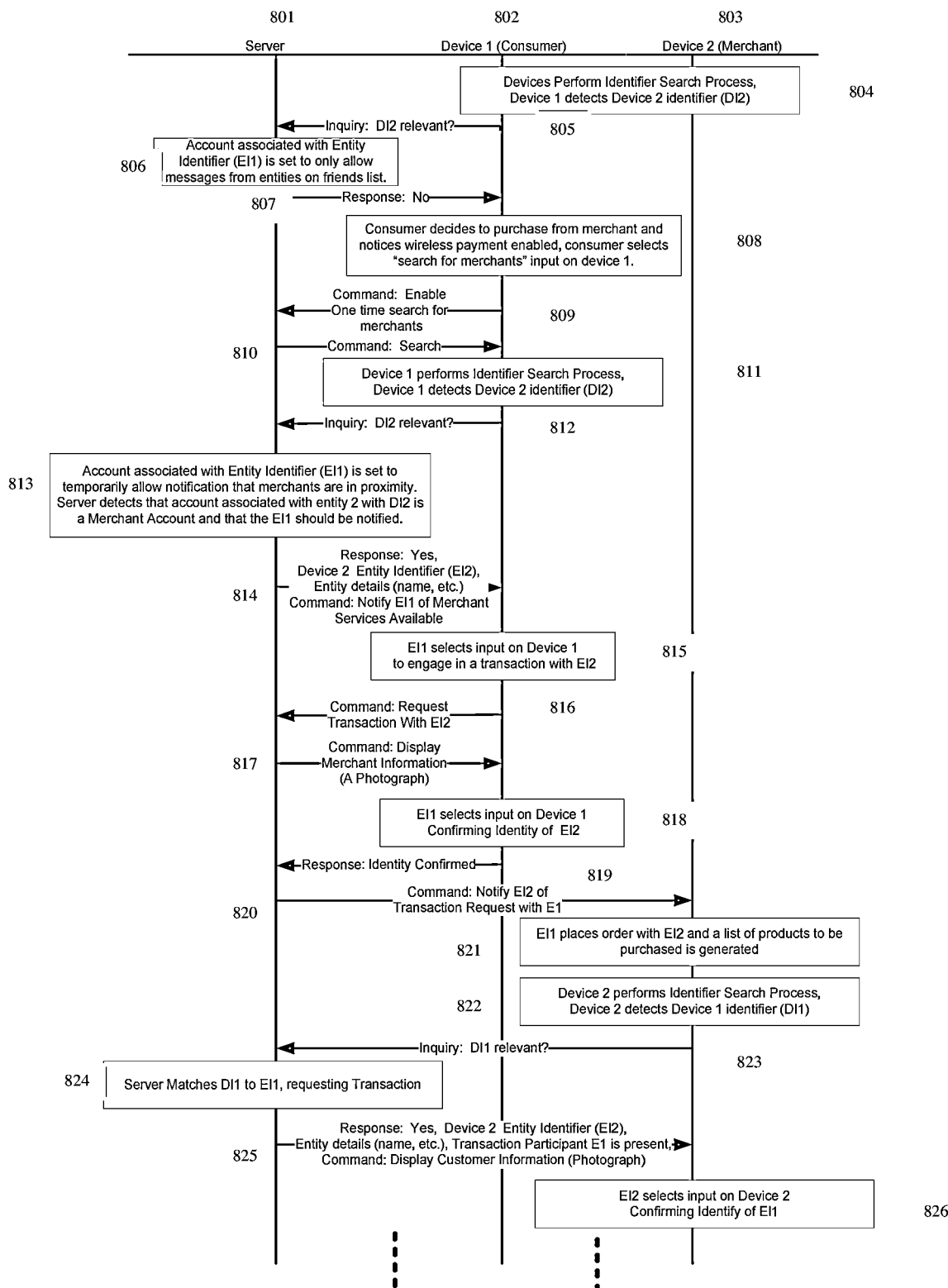
Figure 8A – E Commerce Process

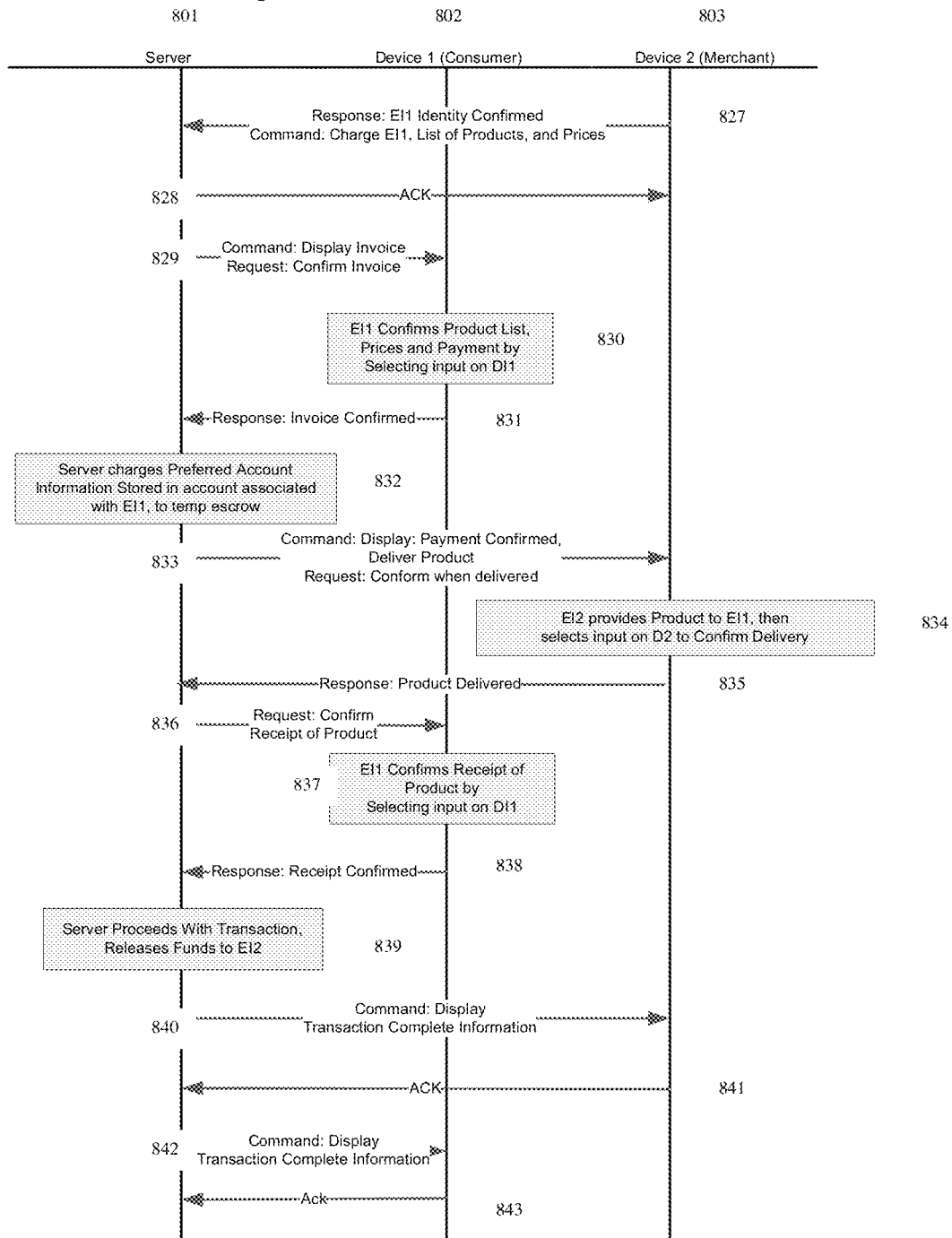

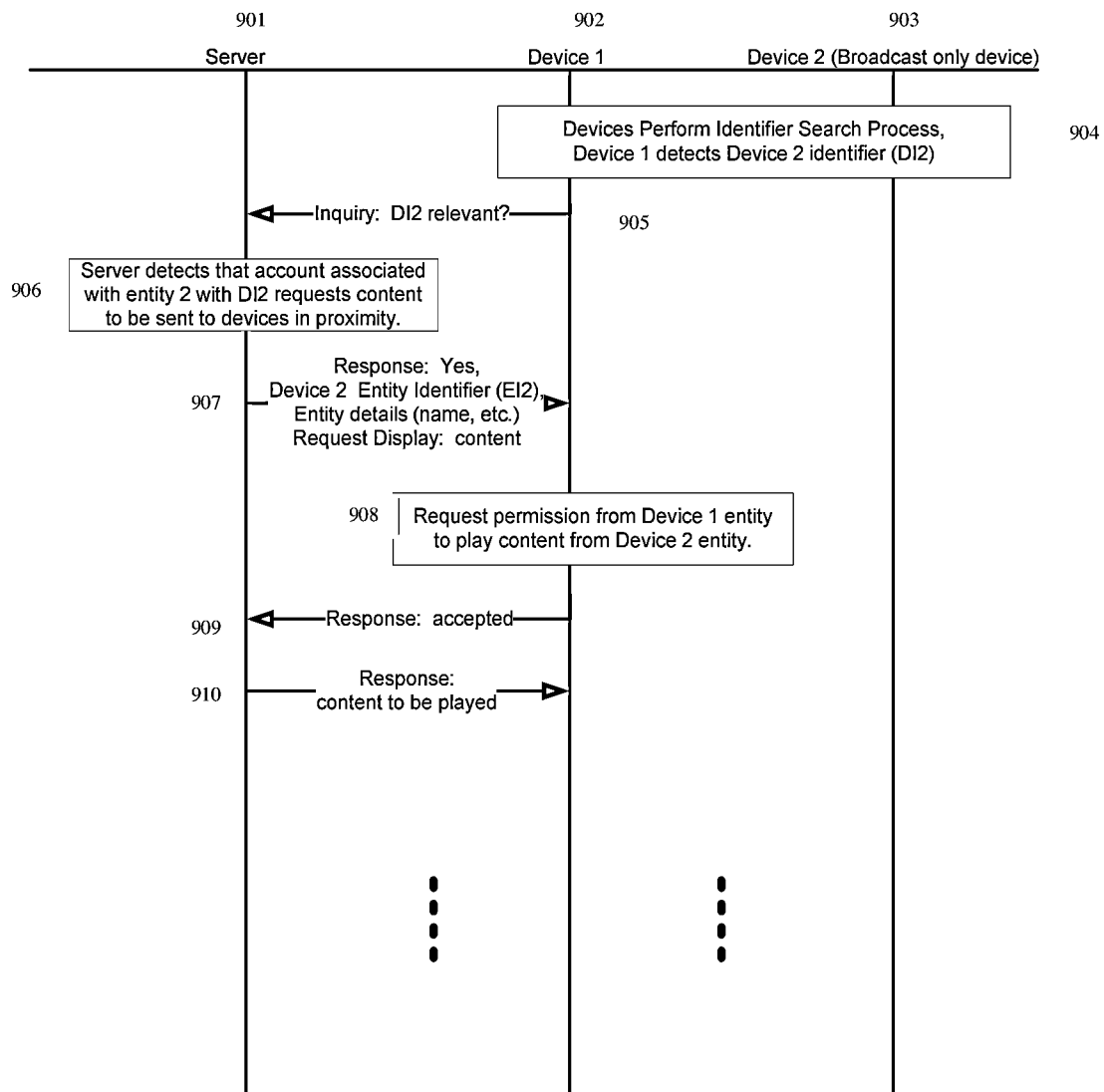
Figure 9 Broadcast and mobile device interaction

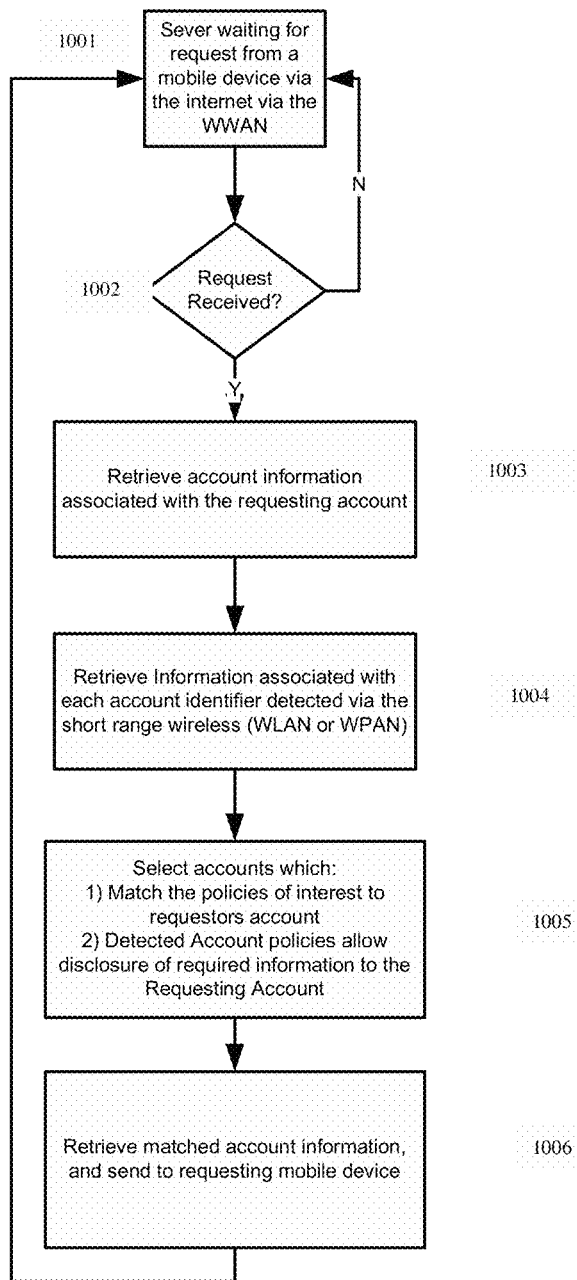
Figure 10 – Server Processing Example for Detected Device

Figure 11 – Example Individual Account Record associated with an Entity Stored in the Server

| Record Index | Field | Field Information Group Disclosure Policy Assignments List |
|---|---|---|
| 1 | Account Number | [All, Explicit Approval, NONE, 1..N] |
| 2 | Identifier | |
| 3 | Identifier Type<br><br>[Fixed MAC Address, Dynamic MAC Address, BSSID, Device Name] | |
| 4 | Number of Fields | |
| 5 | Field List | |
| 6 | Account User Name | NONE |
| 7 | Account Password | NONE |
| 8 | Entity Name | |
| 9 | Entity Address | |
| 10 | Entity Type<br><br>[Individual, Merchant, Broadcast Entity] | |
| 11 | Billing Information | |
| 12 | Device Type | |
| 13 | Device IP Address | |
| 14 | Device SMS Phone Number | |
| 15 | Device Capabilities | |
| 16 | Entity AutoPlay Script 1 | |
| 17 | Entity AutoPlay Script 2 | |
| 18 | Detected AutoPlay Script 1 | |
| 19 | Detected AutoPlay Script 2 | |
| 20 | Entity Instant Message Address List | |
| 21 | Information Group Disclosure Policy 1 (IGDP#)<br><br>[Characteristic 1 (C1), C2,... CN, Friend List 1 (FL1), FL2, .. FLN, etc] | |
| 22 | Information Group Disclosure Policy 2 | |
| 23 | Information Group Disclosure Policy 3 | |
| 24 | Information Group Disclosure Policy 4 | |
| 25 | Additional Personal Information Field 1 (APIF#)<br><br>[Content Type/Content ]<br><br>(Picture, mp3, xml/AJAX, Text, Contact List, URL (MySpace, Facebook, Loopt), Login Credentials (MySpace, Facebook, Loopt, Itunes, etc.), Payment Information (Credit Card Information, PayPal Information, etc.), IM Credentials List (Username/Password)) | |
| 26 | Additional Personal Information Field 2 | |
| 27 | Additional Personal Information Field 3 | |
| ... | | |

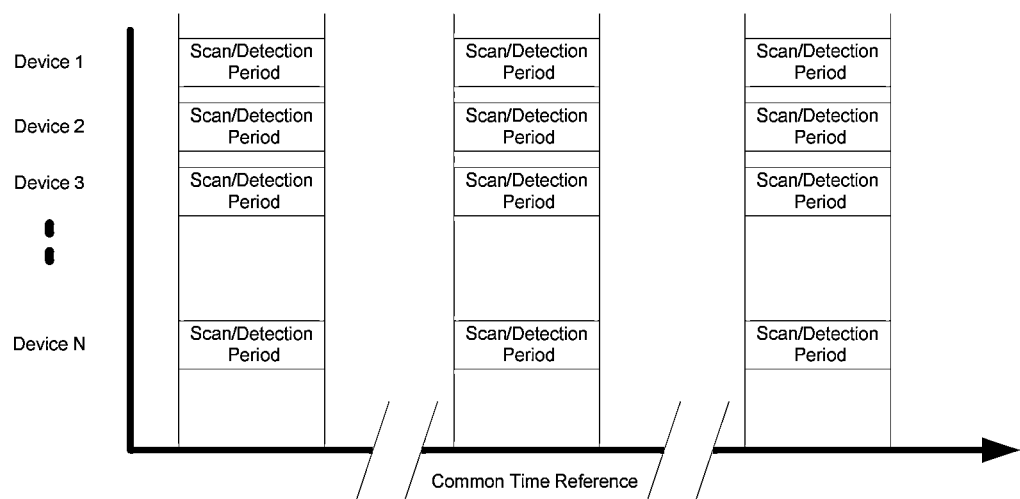
Figure 12 Use of common time reference for intermittent detection intervals

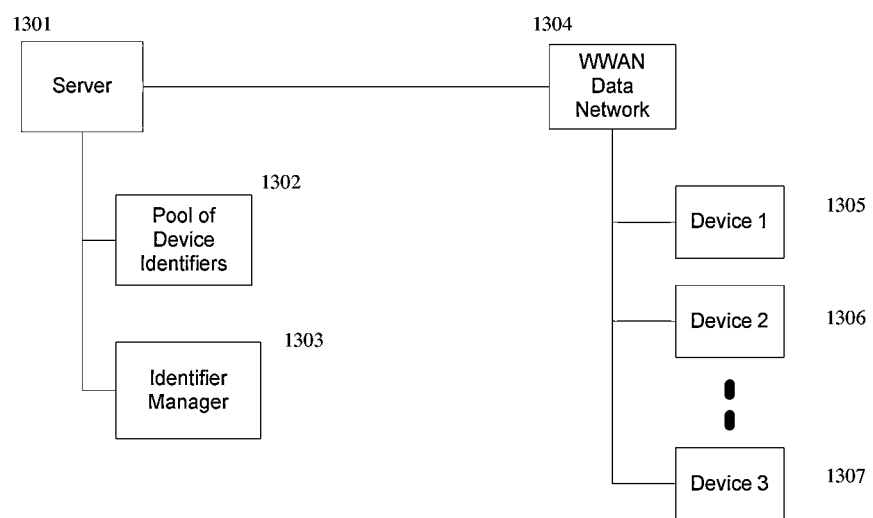
Figure 13 - Management of Device Identifiers by Identifier Manager in the Server

EFFICIENT AND SECURE COMMUNICATION USING WIRELESS SERVICE IDENTIFIERS

BACKGROUND

This patent application relates to wireless communication, and more particularly to efficient and secure communication using wireless service identifiers, such as Bluetooth or WiFi beacon service identifiers.

Most mobile phones on the market today support at least two wireless standards; one for the cellular wireless wide area network connection (WWAN) and one for a wireless personal or local area network (WPAN, WLAN). The cellular connection or WWAN is utilized for voice and data and can adhere to many different standards such as CDMA (IS-2000), GSM, W-CDMA, 1×EV-DO, HSDPA, EDGE, GPRS, WiMax, etc. The WPAN or WLAN connection is typically for short range communications and is often used for wireless hands free devices, such as headsets, peripherals, or higher speed internet connections. The typical standards used for the sort range wireless communications include Bluetooth, Wi-Fi, and in some cases Ultra-Wide-Band (UWB).

In another approach to mobile networking some services have attempted to utilize short range wireless capabilities often available on phones such as IEEE802.11 (Wi-Fi) or Bluetooth to facilitate peer to peer communications. These are also referred to a MANETs or Mobile Ad-hoc Networks. These services typically consist of a software application operating on a mobile phone using peer to peer networks to facilitate communication between wireless devices. Examples of such existing applications include Mobile-Cheddar, Peer-2-Me, and Flobbi. Published US Patent application US 2008/0182591 A1 filed Dec. 13, 2007 describes one such peer to peer approach.

One issue with these approaches is that all information to be exchanged must be stored locally on each of the peer devices as the communication occurs directly between the two devices and any policy for the delivery of locally stored content is difficult to enforce without the potential for fraud such as spoofing identities between the peers. Such fraud may lead to concerns of personal safety or privacy allowing the identity of an individual to be determined when it is not desired.

SUMMARY

Preferred embodiments are generally concerned with facilitating the exchange of information between two entities associated with two wireless devices. In one embodiment, this can be accomplished by a first device using a first short range wireless capability to detect an identifier transmitted from a second device, ideally using existing short range radio communication standard capabilities such as Bluetooth (IEEE802.15.1-2002) or Wi-Fi (IEEE802.11). The detected identifier, being associated with the device, is also associated with an entity. Rather than directly exchanging application data flow between the two devices using the short range wireless capability, a second wireless capability then allows for one or more of the devices to communicate with a central server via the internet, and perform an exchange of application data flow. By using a central server to draw on stored information and content associated with the entity or entities, the server can manage the subsequent exchange of information between the entities and the devices. In a preferred embodiment, this exchange may be comprised of information stored on the server associated with a detected entity, and it may be comprised of information received from the detected device via the second wireless capability and facilitated by the server.

In addition, the server can also allow for a brokering service, ideally independent of the entities, to enable the application of policy based on the identity of the two entities for the disclosure of stored information associated with the entities, the flow in information between the devices and the entities, and the enablement of procedures such as security verification between the entities.

In one embodiment, a method is provided for reducing communications between one or more servers and a wireless device, as well as providing enhanced security and privacy to wireless beacon services.

The method involves transmitting, by at least one beacon transmitter using a short range wireless radio, a first beacon transmission in a first time period. The beacon, which may be a short range wireless protocol such a Bluetooth or WiFi service beacon, comprises a first MAC address, a first unique identifier, and a beacon service identifier.

Using a second radio, the one or more servers also transmit stored information relating to an entity or object associated with the first unique identifier.

A first plurality of beacon transmissions are received by the wireless device during the first time period.

The wireless device then selects one or more unique identifiers from the first plurality of beacon transmissions, by filtering (that is, selecting) only those beacon transmissions which include the beacon service identifier.

The wireless device then takes further action, if the first unique identifier is present among the selected one or more unique identifiers, using the stored information, which includes at least the identity of the entity or object associated with the first unique identifier.

Other embodiments may transmit, by the same beacon transmitter using the short range wireless radio, a second beacon transmission in a second time period. The second beacon transmission also includes a second MAC Address, a second unique identifier, and the same beacon service identifier. In this embodiment, the wireless device also receives, using the short range wireless radio, a second plurality of beacon transmissions during the second time period, as well as second stored information relating to the entity or object associated with the second unique identifier, from the one or more servers using a second radio.

In those embodiments, a second set of one or more unique identifiers are selected from the second plurality of beacon transmissions, by filtering the second plurality of beacon transmissions which include the same beacon service identifier. Further action taken is taken related to the second stored information, if the second unique identifier is present among the selected second set of one or more unique identifiers.

In some embodiments, the further action may include preventing the sending of the first or second unique identifier by the first wireless device to the one or more servers.

In some embodiments, the MAC address is a randomly generated 48 bit number matching a format of a Bluetooth BD_ADDR.

In some embodiments, the further action may include determining that at least one beacon transmitter is a broadcast device having a predetermined location.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the embodiments.

FIG. 4 is a message sequence chart showing the Bluetooth discovery process using in one embodiment.

FIG. 5 is a message sequence chart showing the Bluetooth Remote Name Request Process.

FIG. 6 is a message sequence chart showing the IBSS beacon process.

FIG. 7 is a message sequence chart showing the interaction between the server and two devices performing a detection and entering a chat application.

FIG. 8A is a message sequence chart showing an E-commerce example.

FIG. 8B is a continued example message sequence chart showing an E-commerce example.

FIG. 9 is a message sequence chart showing an example of a mobile device and a fixed broadcast device interaction.

FIG. 10 is a flow diagram for the server processing associated with the detection process.

FIG. 11 is an example individual account record stored in the server associated with an Entity.

FIG. 12 illustrates a timing reference for intermittent active and dormant times.

FIG. 13 shows a diagram of functional blocks associated with management of dynamically assigned device identifiers.

DETAILED DESCRIPTION

A description of example embodiments follows.

The teachings of all patents, published applications and references cited herein are incorporated by reference in their entirety.

Figure 1:
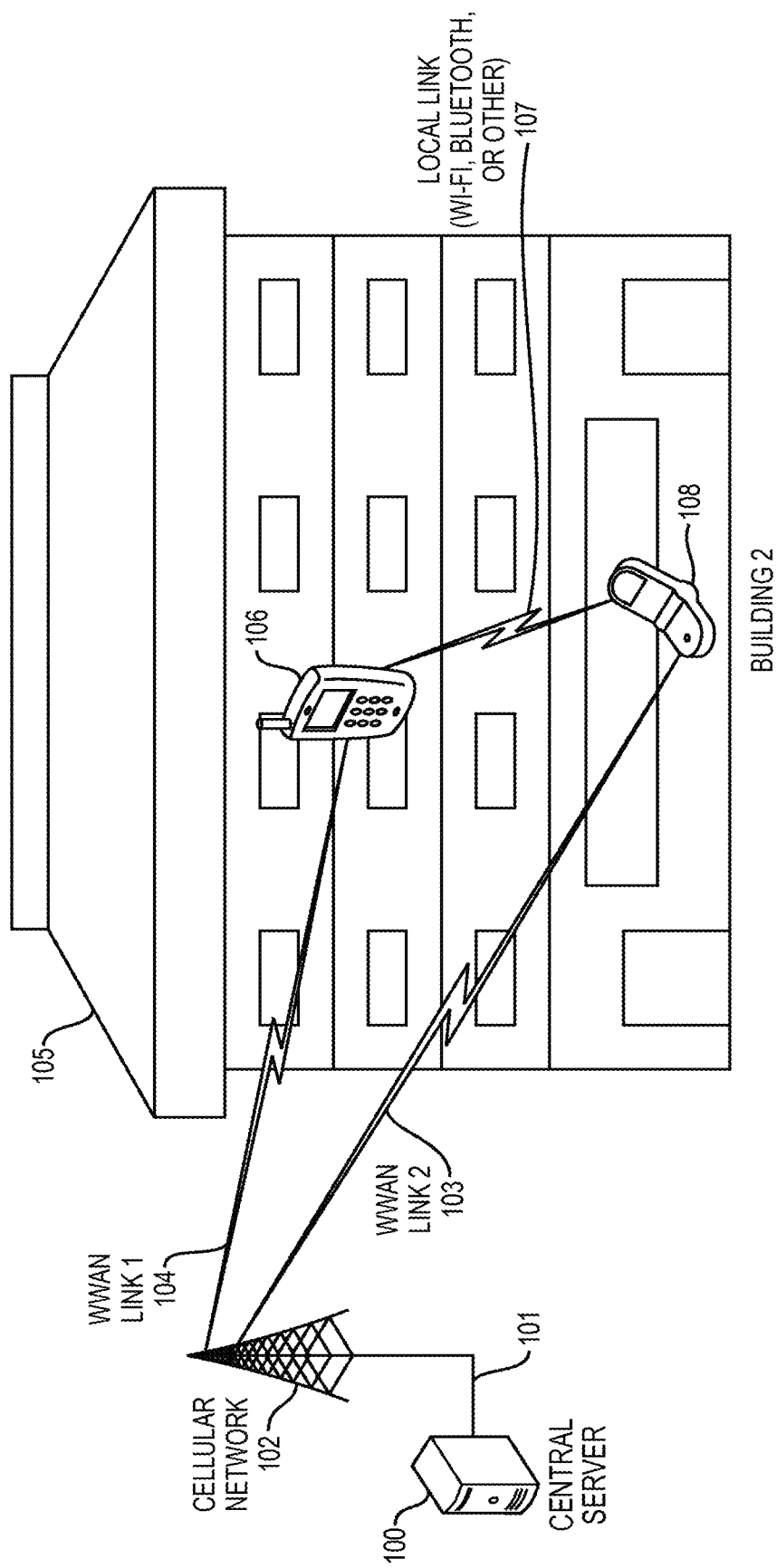
FIG. 1 is a block diagram of two mobile devices utilizing a preferred embodiment.

FIG. 1 is a block diagram of two mobile devices utilizing a preferred embodiment.

Referring to FIG. 1, a central server 100 is connected to devices 106 and 108 by an internet protocol (IP) based network, carried over a series of connections, at least one of which is a wireless connection. For example, the server 100 has a connection allowing IP based communications to a cellular network 102 using connection 101. The cellular network is connected to devices 106 and 108 by wide area wireless links 104 and 103 respectively, allowing for IP based communications between the devices (106 and 108) and the server 100.

Devices 106, 108 can be considered "client(s)" of the server 100. The clients 106, 108 and server 100 provide processing, storage, and input/output devices for executing wireless system protocols, interfaces, and application level programs according to several embodiments. Client devices 106, 108 can also be linked through various communications networks to other computing devices, including other client devices/processes and other server computer(s). Communications network(s) providing the connection 101 can typically be part of a remote access network, a global network (e.g., the Internet), a worldwide collection of computers, Local area or Wide area networks, and gateways that currently use respective protocols (TCP/IP, 3G Wireless, Bluetooth, etc.). Other electronic device/computer network architectures are suitable.

The internal structure of devices 106, 108 or server 100 includes one or more data processors (not shown in detail) that are well known in the art to include a system bus for data transfer among the other internal components of a computer system (e.g., processor, disk storage, memory, input/output ports, network ports, etc.). Attached to the bus are other input/output devices (e.g., keyboard, mouse, displays, printers, speakers, network interfaces, etc.). Network interfaces allow the computer to connect to various other devices attached to a network. Memory provides volatile storage for computer software instructions and data used to implement an embodiment (e.g., applications programs and the like). Disk storage can provide non-volatile storage for computer software instructions and data used to implement the embodiments.

One embodiment may include a computer program product including a computer readable medium (e.g., a removable storage medium such as one or more DVD-ROM's, CD-ROM's, diskettes, tapes, etc.) that provides at least a portion of the software instructions for the system. Computer program product can be installed by any suitable software installation procedure, as is well known in the art. In another embodiment, at least a portion of the software instructions may also be downloaded over a cable, communication and/or wireless connection. In other embodiments, the programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions.

More particularly, a given device 106, 108 uses a short range wireless link 107 such as a Bluetooth (IEEE802.15.1) or Wi-Fi (IEEE802.11) link to detect the presence of other devices such as device 108, and uses the wide area wireless network connections 103, 104 such as IS-2000, WCDMA, GPRS, EDGE, LTE, Wi-Max (IEEE802.16), or the like to perform communications to central server 100, and to perform the actual substantive communications between the wireless devices 106 and 108. Device 108 typically uses the short range wireless link 107 and wide area wireless link 103 in a similar manner to locate and initiate communicate with device 106. One distinction relative to prior art is that the short range wireless 107 is only used for the detection process, or to advertise a device's presence. In this embodiment, specific information called "wireless identifier" or simply "identify" (described in more detail below) is passed between devices 106 and 108 over the short range link 107. By transmitting a wireless identifier using the short range Wi-Fi, Bluetooth or other short range wireless link 107 and receiving wireless identifiers from other devices, this short range wireless link 107 will allow for a proximity detection process.

The support for IP based networking is standard for WWAN or 3G connections such as 1×EV-DO or HSPA, and as a result, communication between one device to another using the WWAN is currently supported in many devices with no modification. The use of simple detection of one or more identifiers requires significantly less resources in a phone than performing a complete peer to peer based communication network protocol, which accommodates dynamic configuration of nodes being added and dropped continuously. It is noted that the IP address on the WWAN interface is not location dependent in the present embodiment, but is addressing approaches are location dependent when true Peer to Peer topologies are used. The present embodiment has the advantage that communication between two devices may continue after the devices have left proximity of each other, but in the same manner as they had been communicating previously. As a result, a user who detects a short range transmission of an identifier, then begins a conversation or some other interaction with that device via the wireless wide area network may continue that conversation even in the case where the two devices move out of the proximity of the each other, and are no longer within the reception range of the short range wireless communication protocol. Further, since it is contemplated that the wireless identifiers transmitted on the short range wireless link from the devices would occasionally change, for security reasons, the present embodiment has the advantage that ongoing communications between mobile devices will not be interrupted despite a change in one of the device's identifier. In the case where the identifier is a MAC address of the short range wireless network adapter for one of the devices, it is not otherwise possible to change this address and easily maintain on going communications in a true peer to peer topology.

Figure 2:
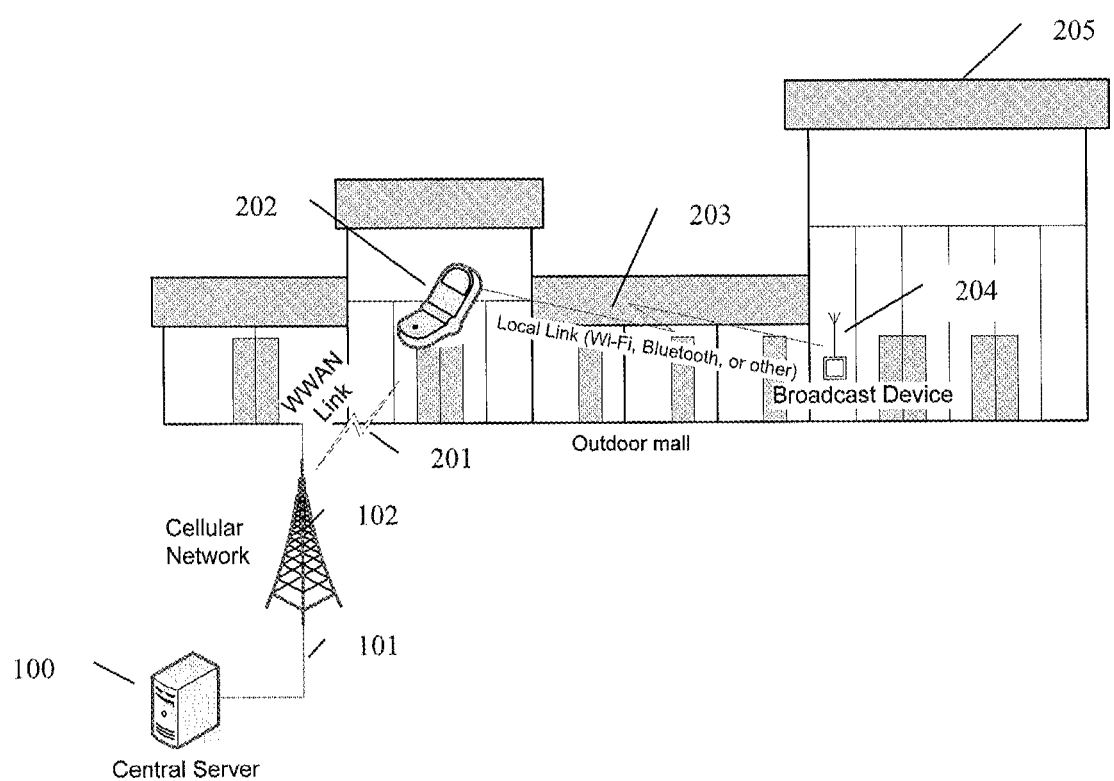
FIG. 2 is a block diagram of a fixed broadcast device and a mobile device.

Referring to FIG. 2, central server 100 is connected to the cellular network 101, and is able to communicate information to and from wireless device 202 using a wide area wireless link such as IS-2000, WCDMA, GPRS, EDGE, LTE, Wi-Max (IEEE802.16), or the like within structure 205. Device 204 does not have a wide area wireless or cellular link, but transmits identifying information using short range wireless link 203. Device 202 is capable of receiving the indentifying information and requesting information related to that device from server 100.

An example of an application using this infrastructure follows. The device 204 will simply broadcast an identifier, with no WWAN connection but may facilitate advertising or local information. For instance, an account associated with one or more identifiers may belong to a museum. As a museum patron walks to an exhibit, the patron's device 202 will receive an identifier sent from museum broadcast device 204 operated by the museum. The patron device 202 passes the identifier or museum device 204 to the central server 100, which in-turn recognizes it as being associated with that exhibit within that museum and passes relevant information back to the user's device 202. A distinguishing feature of this approach relative to prior art is that the patron device 202 in this example may move out of proximity of broadcast device 204, yet continue to view the content being provided by the server 100 related to the detected broadcast device 204. Content may include text, pictures, web pages, application software such as games, informative display applications, or other content such as audio or video to be offered to the user's device as well. Other examples might include electronic coupons (such as in a grocery store), menus or special offers in a restaurant.

Figure 3:
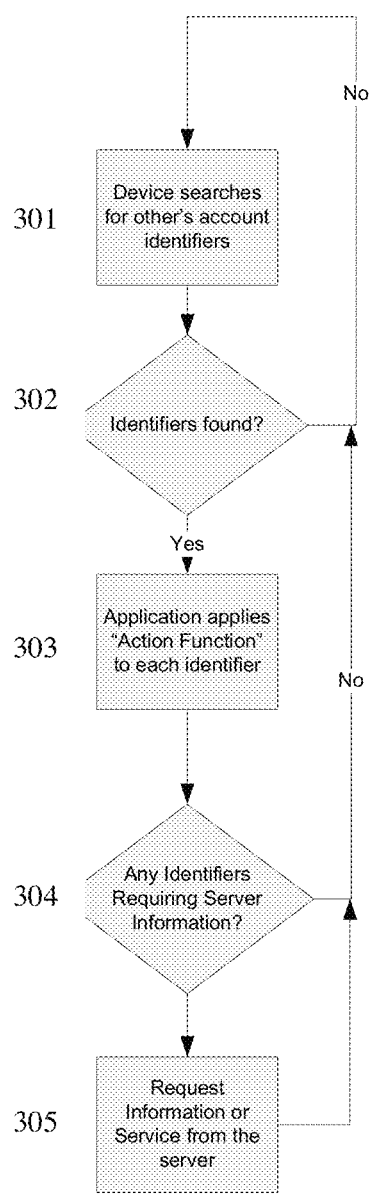
FIG. 3 is a flow diagram of the operation of an application on the mobile devices.

FIG. 3 is a block diagram with further detail of this operation. A device 106, 108, or 202 after performing a search (FIG. 3, step 301) for identifiers on the WPAN or WLAN, will subsequently use the WWAN link to communicate with the central server 100. If the device does not find identifiers 302 it will either continue to search, or search at a later time 301. If identifiers are found in 302, the device may employ an action function 303, which would act as a filter that determines which of the detected identifiers should be passed to the server. This function may instead be omitted and all identifiers passed to the server 100. The idealized effect of the action function would be to reduce the number of requests to the server by not re-requesting recently requested identifiers which have already been passed to the server, for some period of time. In step 304, if no identifiers require server information, searching is continued in step 301.

Assuming there are identifiers which are new to the device, the device will pass along a list of currently detected identifiers and request 305 that the server return information related to any other local device. The server will return the information related to any identifier that meets certain policy requirements. For instance, information is returned which is 1) relevant to that device, and 2) that the device is authorized to receive.

As an example of the overall process, a detected identifier may be relevant to the receiving device if the user associated with the detected identifier is listed in a "friends list" for the owner of the receiving device. If the identifiers for the individuals within the friends list have been passed to the device, the action function 303 may make this determination. In the preferred embodiment, the server would determine the identity and the relevance of the detected identifiers, and the action function 303 would work to reduce frequency of re-requests to the server. FIG. 7 describes an example of how to use this for messaging associated with the device and server interaction during the detection and identifier inquiry process, with a more detailed explanation to follow.

To enable server 100 to associate an identifier with an entity, each device or entity (such as the museum) associated with an identifier has an account on server 100 or a related server as is common in information technology. The account is associated with the entity and the device and the current identifier.

As used herein, an "entity" may be a legal entity, such as an individual person or a business.

An "object" is intended to include a physical thing, such as a product that is being offered for sale, and may include a tangible article or intangible such as an electronic music or video file or photograph.

There is various information associated with each account. An example data record for an account is shown in FIG. 11. When the account is associated with an individual or (other entity), there may be personal information such as the individual's name, contact information, information regarding allowed communication, such as chat or IM, links to their other social networking services, and the like. When the account is associated with a broadcast device 204 the account may contain content to be displayed to the detecting device 202. By utilizing the central server 100, broadcast devices may be tied to a location or product thereby providing relevant information about the location such as in the museum tour example previously discussed. In this situation, the content delivered to device 202 may be informative information about an exhibit including pictures, text, audio, or video and the like. In the case of a broadcast device being in a supermarket and near a specific product, advertisement or discounts with electronic coupons my be stored in the account and provided to device 202.

There can also be policy based permissions associated with each account and applied to any information associated with that account. The stored policy permissions can be used to determine what information and under which situations information may be disclosed to another device or user associated with another account. For example, the entity (person in this case) associated with device 202 may have set a policy in their account to not receive any unsolicited information from a broadcast device so as to not be disturbed. However, the person associated with 202 may see the broadcast device and a sign stating a discount is available, and provide input to their device to request any broadcast information on a one time exception basis. The messaging associated with an example mobile and broadcast device process will be described in more detail to follow associated with FIG. 9.

As already mentioned above, in step 301 of FIG. 3, each device performs a search function looking for identifiers sent from other devices utilizing a short range wireless capability. The following describes the process of devices detecting identifiers from other devices in more detail.

The identifiers themselves may be a hardware address such as the MAC address of the wireless device, or they may be another label such as the SSID for a IEEE802.11 device, or the device name for a Bluetooth device. Referring to FIG. 4, in the case where a Bluetooth wireless personal area network device is utilized, a first device 401 transmits an inquiry (ID_Packet) message 404, and any proximal Bluetooth devices 402, 403 respond with messages identifying the MAC address, called BD_ADDR in IEEE802.15.1 of each device using a message referred to as an "Inquiry Response" FHS message 405 containing the BD_ADDR or Bluetooth device address of the detected device. In the Bluetooth standard all devices 402, 403 are required to respond in this manner assuming they are enabled to be discoverable. To enable this, an application on the mobile device ensures the Bluetooth device is set to discoverable mode. Device 1 (401) will attempt to locate Devices on different channels by scanning the channels and transmitting multiple Inquiry (ID_Packet) messages. Such an example is shown with inquiry exchange 406 and 407 to discover Device N (403).

In one embodiment the BD_ADDR or MAC address of the Bluetooth device can be used as the Identifier and no further Bluetooth interaction is required until the next scan process is performed.

In another embodiment, the Bluetooth "Device Name" is used as the identifier. Figure shows the process of a first device "Device 1" (501) determining another Bluetooth enabled device's (502) Bluetooth Device Name. Following the device discovery process completion from FIG. 4, Device 1 501 sends a Page message 503 to another device (Device L 502). Message 504 is sent in response to create a temporary Asynchronous Connectionless Link (ACL) to be established between Device 1 501 and Device L 502, without an explicit connection request. Not having an explicit connection request indications the Entity associated with Device L would not have to provide explicit approval for a connection from their user input on the device, as would be the case if other services were requested from the device such as might be the case with a wireless headset or remotely connected GPS receiver to a phone. An ACL connection allows link management packets to be exchanged, and following interchanges of messages 505 and 506 to determine features of the devices, a temporary connection is established between the two devices. A name request message (507) is then sent by Device 1 to Device L, and Device L responds with at least one LMS_name_res message 508 containing the Bluetooth device name of Device L 502. If the name is longer than that allowed within the LMS_name_res message, additional messages follow to allow for the entire name to be delivered. Finally the connection is ended with message 509, LMP_detach.

The transmitted identifiers associated with any given device are only known to the central server and the device transmitting the identifiers. These identifiers may change from time to time, making a user's or a device's identity anonymous over time. The central server and any particular device must be coordinated such that the identifier and any device transmitting it, remains identifiable by the central server. This process is coordinated between the wireless device, and the central server utilizing the WWAN or cellular data link, carrying messaging between them and using an identifier manager 1303 to maintain a list of device identifiers 1302 in a central but secure location. This is shown in more detail in FIG. 13.

Referring to FIG. 6, an example of using on IEEE802.11 link as the short range wireless capability is discussed. Generally, Wi-Fi devices operation in a so-called infrastructure mode which utilizes a BSS or basic service set. One component of a infrastructure network based wireless LAN is the use of a central access point or AP. In a mobile network the use of a central AP is not practical, as only the AP transmits an identifier, which does not meet the requirements of the preferred embodiment. The second topology for Wi-Fi networks is the so-called Ad-Hoc mode of operations, referred to as an independent basic service set or IBSS. In an IBSS all devices participating or advertising their interest in participating in an ad-hoc network transmit identifiers called beacons. These beacons contain the MAC address of the transmitting network adapter, the basic service set identifier (BSSID), and ad-hoc network name or service set identity (SSID). The BSSID in a typical ad-hoc network is generated by the first station to enter the BSSID and is locally administered, typically a randomly generated 48 bit number matching the format of a MAC address. In an ad-hoc network, each device 601, 602, 603 participating or desiring to participate transmits a beacon. There are several embodiments related using the IBSS beacons and the identifiers. First the identifier may be used as the MAC address of the station device or network adapter, and one or both the BSSID and the SSID may be used to indicate these particular beacons are associated with a service. In other embodiments, one or more of the BSSID and the SSID may be used as the identifier. In any of the embodiments for delivery of the identifier in an IBSS beacon, it is possible to coordinate the change of those identifiers with the server 100. As the MAC address is always broadcast in any operation of a Bluetooth or Wi-FI link, the use of a MAC address as an identifier provides for an additional level of security for the device 601, 602, 603, when identifier is changed from time to time as devices may be detected and identities tracked using a constant MAC address. In the preferred embodiment, where the MAC address is used for the identifier, all the devices participating would likely have the same network name and SSID to aid in the identification of the device as being enabled, although not necessarily required. Examples using an 802.11 network in ad-hoc mode transmitting beacons are showed as messages 604, 605, and 606.

Chat Example Between Two Mobile Devices

FIG. 7 shows an example of a message flow diagram for an embodiment where an individual is in a library for example, and a friend arrives. The individual is notified by their device receiving an identifier that their friend is present and they enter a chat session. Each person has a device (FIG. 1, 106 and 108 respectively) that implements the preferred embodiments described above. The first individual associated with Device 1 (702) referred to as Entity 1 (EI1) performs a detection process as described in FIGS. 4, 5, and 6 previously (step 704). The device identifier associated with Device 2 (703), DI2 is thereby detected. Device 1 (702) then transmits an inquiry message 705 using the WWAN (cellular data link such as GPRS, EDGE, 1×EV-DO, IS-2000, Wi-Max, LTE, or the like) to the server 701 inquiring if information related to the account and entity associated with DI2 is relevant, and available to the entity EI1 associated with Device 1 (702). The server 701 retrieves the account information related to EI1 and determines that EI2 is listed in a friends list in the account associated with EI1 and that EI1 should be notified when EI2 is detected. Next the server retrieves the account information associated with EI2 and determines that EI1 is on a list of entities which are allowed to be notified of EI2 being present and personal information such a the name of the individual, their phone number and the like. The server having determined that EI1 wants to be notified and is allowed to be notified responds in Step 706 to Device 1 (702) with a message indicating the DI2 is relevant to EI1 and including information such as Entity Identifier EI2 and associated details. A user application on Device 1 (702) notifies the user that the entity associated with Device 2 is in proximity in step 707. The user of Device 1 provides input to the device directing it to request a chat session with the entity associated with Device 2 (703), and a message 708 is sent the server 701 commanding "send 'Hello' to EI2". The server acknowledges reception of the message with a "ACK" message 709, in return. Next server 701 sends "Request Chat: 'Hello' from EI1" to Device 2 703. The user of Device 2 accepts the chat and returns a message "I'm by the front door" with message 711, sending it to the server to be relayed to device 1 (702).

E-Commerce Between Two Mobile Devices

FIGS. 8A and 8B show a message flow diagram for an embodiment where two individuals are performing a financial transaction on the street (for example, a customer and a street vendor). Each has a device (FIG. 1, 106 and 108 respectively) enabled with the preferred embodiments described above. In this example, an individual's device would see a vendor and the vendor's device (enabled with various embodiments) would notify them that the vendor was also enabled with a device supporting the identifier search and other protocols described above, as well as being capable of electronic payments. These steps are performed in the following way. In step 804 the customer's device 802 (Device 1) performs an identifier search process as previously described, and detects a device identifier 2 (DI2) sent from Device 2 (803) belonging to the merchant. Device 1 will send a message to the server 801 (also represented by 100 in FIG. 1) using the WWAN (cellular data link such as GPRS, EDGE, 1×EV-DO, IS-2000, Wi-Max, LTE, or the like) 104 requesting information related to DI2 and its relevance to the entity related to device 1 802. The server 801 then determines the relevance of DI2 based on the account properties stored in the account associated with the consumer Device 1. In this case, the account settings only allow messages from or notifications of entities on a friends list stored in the account record (represented in FIG. 10) associated with the consumer. Server 801 responds to device 802 with "no" indicating that DI2 is not relevant to the Consumer.

The customer, having an account enabled with electronic payments, and wanting an item the vendor has, would press a button or make other input to his phone (or other device) which would indicate they would like to make a purchase and pay using their device (808). In this case the input selection would be "search for merchants." The customer's device would then send a message (809) to the central server directing the server to perform a one time search for merchants, despite the current account settings. In one embodiment, the server would then direct the consumer's device 802 to initiate another search (809). Other embodiments may not include the server commanding Device 1 (802) to perform the search, but rather the search may be performed automatically, or use results from a recent search. In Step 811, Device 1 (802) performs another search and detects the identifier from Device 2 (803), DI2. Device 1 then sends a message 812 to the server again requesting information for all relevant devices detected, which will include at least DI2. In Step 813 the server, having received the request and list including DI2, looks up account information associated with DI2 and determines that the associated entity is a merchant. As the settings of the account associated Device 1 now allow for the notification of the user when a merchant is detected in proximity, DI2 is determined to be relevant to Device 1 and the Entity 1 (EI1) should be notified. The server then sends a message 814 to Device 1 (802) stating merchant services are available in proximity with a list of available merchant's information including information related to the entity (EI2). The user of device 1, Entity 1 (EI1) then provides input in step 815, (pressing a soft key on a touch screen for instance), selecting the specific merchant EI2 to engage with in a transaction. Device 1 (802) will then send a message (816) to the server requesting a transaction with EI2 associated with Device 2 (803). The server (801) will then respond in this embodiment with a message 817 to Device 1 confirming receipt of the requested transaction and providing information to allow the Eli associated with Device 1 to independently confirm the identity of EI2 associated with Device 2 (803). In this embodiment the identifying information can include the name of the merchant, the merchant's logo, a picture of the vendor, or their mobile shopping cart. In other embodiments, the picture may be of a specific unattended vending machine in the location it is currently operating. It may also include other information such as the address of the merchant in cases where a fixed store location is provided. As this particular merchant in this example is a street vendor, an address may not be used. GPS information stored in the account associated with Device 2 may be used as further confirmation in some instances. However, in this example, GPS coordinates are not be available on Device 2 due to lack of capability, or Device 2 being indoors and without sufficient signal to determine a location. Further GPS information from Device 1 (802) may be used to provide further confirmation information. In this embodiment the photograph sent in message 817 shows a picture of the particular merchant and also his city issued business license in text and as a picture of where it is displayed on the cart. The consumer entity EI1 provides input to Device 1 in step 818 confirming the identity of EI2, the merchant entity associated with Device 2 (803). Device 1 then sends a message 819 to the server 801 confirming the identity of the merchant.

Server 801 then sends a message 820 to the merchant's device 803 notifying them of the request for a transaction with EI1. Device 2 (803) then indicates to the merchant that a customer with the capability and desire to pay electronically is in proximity. In step 821 the customer associated with Device 1 (802) places an order with the merchant associated with Device 2 (803) and a list of products to be purchased is generated and the merchant provides input to Device 2 (803) to proceed with a electronic transaction. In step 822 Device 2 performs a scan of identifiers and DI1 associated with device 1 (802) and the Consumer is detected. A request is sent to the server 801 with a list of identifiers which were detected to determine if any of them are relevant to the merchant. Note that while the merchant device 803, (and the merchant) have now been notified of the desire for Eli to enter a transaction, they do not necessarily know the identifier for Eli yet. In other embodiments, the identifier associated with Eli and Device 1 (802) may be sent in message 819, and a confirmation that this identifier is detected during the scan process 821 may be performed at the device. In the preferred embodiment, further security may be provided by the having the server perform this function independently. The server performs this confirmation in step 824 may matching the device 1 identifier DI1 with the information stored in the account associated with Entity 1 (EI1) also referred to as the Consumer.

The server than generates a message 825 to Device 2 (803) indicating that EI1 is relevant, and the transaction participant is present. The message in the preferred embodiment can also include a picture of the Consumer. Additionally, the message could also include other pictures of other individuals allowed to use this device for purchases. If more than one identifier was detected in step 822 and matched in step 824 to entities having requested transactions previously which are pending for that merchant, a list of information for each entity involved with a pending transaction request can be provided in message 825. The merchant then selects the correct consumer using the picture of that consumer, confirming the identity of the part to the transaction in step 826. The consumer information provided in message 825 in another embodiment may simply be the name of the customer and the merchant may either ask their name, or request identification such as a driver's license. In the preferred embodiment, where a picture is passed in message 825, it is not necessary that the individual's name be passed to the merchant for the merchant to be able to provide confirmation of the identity of the Consumer thus providing a level of anonymity to the transaction such as may be present when cash is used.

Following the confirmation by the merchant of the identity of the Consumer participating in the current transaction in step 826, Device 2 sends a message 827 to the server confirming the identity of the Consumer as Entity 1 (E1), and with information required for the transaction including the list of products to be purchased, their prices, the total price, and a request to charge E1 this total amount. Server 801 then confirms receipt of this message in step 828. The server then sends a message 829 to Device 1 requesting the Consumer to confirm the list of goods to be purchased and the total price to be paid. In step 830, the Consumer (Entity 1) reviews the list and amount to be paid and provides input to device 1 confirming the accuracy of the information and they the authorizing the server to pay. In step 832 the server charges E1 utilizing stored preferred charge card information, stored credit, or other payment method such as a PalPal™ user name (PayPal is a trademark of Ebay, Inc.) and password stored in the account associated with E1, and charges the consumer. In the case where a stored credit is used, the Consumer's account can be debited, and the credits not applied to the merchants account until a later step. In the case of a credit card, or PalPal™ transaction, the server provides payment to E2 (the merchant) utilizing information stored in the account associated with Device 2. The server then indicates payment is made to the merchant, and instructing the merchant to deliver the goods with message 833. E2 (the Merchant) then provides the goods and provides input to Device 2 that the goods have been delivered in step 834. Message 835 is generated by Device 2 (803) to the server confirming product delivery, and acknowledging the receipt of the payment confirmation message 833. The server can then send message 836 requesting the Consumer to confirm they received the goods. If a confirmation is not received in response to this request, this information may later be used to settle any dispute that might arise. In step 837 the consumer confirms receipt of the products, and message 838 is generated to the server confirming the receipt of goods by the consumer. In Step 839 the server concludes the transaction by completing any steps required to credit the Merchant with the payment amount from the Consumer, if required. The server then sends a message 840 to the Merchant indication the transaction is complete, which is acknowledges in message 841. The Consumer is notified of the completed transaction with message 842, which is acknowledged with message 843.

Finally, the transaction details may be stored by the server, or sent to a thirdly party server for tracking spending habits of that account holder, or customers of that merchant allowing the merchant to track that specific customer's behavior and cater to them in the future with various specials delivered via email, or during their next visit via their device in the form of an electronic coupon. This process can be performed with a goal to help the merchant expose the customer to other products or services the merchant believes the customer might find desirable.

The apparatus, systems and methods can be extended to facilitate other types of transactions as well. In one specific application, consider use of the invention to facilitate a transaction such as the rental of an automobile. A well known business called ZipCar™, presently operating in several major urban areas in the United States, makes available a fleet of vehicles for shared use by their club members who pay a monthly fee plus a per use charge. Using the embodiments herein, the club member would have a wireless device that serves as the "Consumer device" (Device 1) and the ZipCar vehicle would be equipped with a wireless device serving as the "Merchant" device (Device 2). The consumer would walk up to an available ZipCar vehicle and, using their wireless device, start an initial exchange of identifiers with the desired Merchant device, for example, using the short range local wireless network. The Consumer device and/or Merchant device would send a message to an application running on the Server requesting that a person associated with an account for the Consumer be granted access to a specific vehicle (e.g., an "object") that is in the vicinity of and associated with the Merchant device. A set of confirmatory messages (such as to exchange access codes, to confirm the location of the vehicle, the per-use fee due, and payment for the same, etc.), are then typically also exchanged between the Consumer and the Merchant device with the assistance of the Server and the long range wireless network. Upon confirmation of the necessary transaction information, the Server sends a message to the Merchant device to unlock the vehicle requested (which may be sent over the second long range wireless network or a yet another network, such as a satellite network).

Example of a Mobile Device and a Broadcast Device.

FIG. 9 shows a message flow diagram for an embodiment where an individual is in the presence of a broadcast device, such as for the museum example of FIG. 2. As with FIG. 2, the individual device 202 and the broadcast device 204 are present and enabled. In this example, an individual 902 is in a grocery store and their device 902 (Device 1) performs a scan for identifiers in step 904, as described previously. DI2 is detected having been transmitted from device 2 (903). Device 1 (902) sends a message to server 901 inquiring if DI2 is relevant to the entity associated with Device 1 and if the information associated with that device identifier (DI2) is available to be returned. In step 906, the server retrieves the accounts associated with both DI2 and Device 1 (EI1).

The server detects that the entity associated with DI2 is an advertisement company, and that this device is a broadcast device only, and that there is an electronic coupon available for download to Device 1, and multimedia content available to be played if desired. Additionally, the account settings associated with EI1 allow for the notification of broadcast devices in proximity.

Server 901 then transmits a Response message 907 indicated the presence of the detected device and the content available. The device 902 requests input from the entity associated with the device 901 for permission to download the coupon, and the availability to play content such as video about how to prepare a recipe using the vendors product. In this case the individual associated with Device 1 accepts the content, and a message 909 is sent to the server accepting the content. Response message 910 begins the delivery of the content.

As previously mentioned, several key distinctions of this embodiment include that the user of device 902 may walk away out of range form the broadcast device 903 and continue to receive the content using their cellular link, or may choose to play the content at a later time having stored the detected like in a favorites list. Additionally, the content stored in the account associated with the broadcast device 2 (903) is relevant to the placement of the device and the products near it. Further, as the content is stored in the server 901 rather than in the broadcast device 903, the content may be updated, modified, or deleted at anytime. For example the server 901 knowing that the consumer has never been detected previously, may customize the electronic coupon to provide a deeper discount than a regularly detected consumer. In the case where the devices are used for electronic commerce as in FIG. 8, knowledge of the user's past purchases may be used to induce the consumer to try a new product. Alternatively if the consumer is a regular purchaser a loyalty program may provide a coupon upon a particular number of repeated purchases.

FIG. 10 is a processing flow chart performed by the server receiving a request from a device inquiring about the relevant and availability of information associated with detected device identifiers. In step 1001 the server is waiting for a request from a device. When a request is received in decision 1002, step 1003 is performed. In this step the account information associated with the requesting device is retrieved. In step 1004 the information associated with the accounts for each of the detected device identifiers is retrieved. In step 1005 the server performs a matching process between the policies of the requesting account and each of the policies for each account associated with each detected device identifier. In step 1006 the information related to the matched policies for the associated entities will be sent to the requesting mobile device.

Just as in the previous example of an identifier being deemed relevant to a user based on a friends list, permission for disclosing a device's presence may require being on a friends list as well. For example, when a server receives an inquiry from a device with a list of identifiers, it may only respond with information for users associated with the identifiers that are on that device's friends list, and on each of the individual's friend lists as well. These friends' lists and policies can be stored within a user account which allows for disclosure of a user's presence only to individuals on this list, such as described in FIG. 11 (to be described below.)

It is contemplated that the permissions not be an "all or nothing" decision, but that different classes of information may be assigned different permissions and mechanisms. An example of this might be a user's presence, identity, and cart services being made available to only one set of other accounts (or users), while the presence of an anonymous individual being made available to anyone, but with other classes services available such as multi-player games being treated differently. Additionally multiple contacts may be included in the account, each given customized permissions. An example can be that any user may be notified of an anonymous user or other information based on additional policies.

As only the server contains personal information, and performs the association of an account with a particular identifier, it can inherently enforce the security of the policies as a distinct advantage relative to true peer to peer services. In this way, the central server controls the process of passing information related to an account to a particular requesting device.

FIG. 11 shows an example account record to be associated with an entity and at least one device. The columns of the account record can consist of a Record Index which will be used to described the account, a Field which is a descriptive name for the contents stored in the record, and a Field Information Group Disclosure Policy Assignment List (PAL). The PAL provides rules for the disclosure of the information in the associated row in the Field column. The following list are possible PAL entries:

ALL: may be disclosed to any requesting entity
EXPLICIT APPROVAL: the Entity associated with the account must provide input approving the disclosure of the information
NONE: Do not disclose this information to any other entity
M: where M is a integer from 1 to N indicating a Information Group Disclosure Policy which may consist of a list of contacts, friends, groups, characteristics, and the like.

Most of the fields in FIG. 11 are self explanatory and typical in the industry such as the account number, however a few fields are worth a clarifying discussion. The Device identifier is in record index 2, with a Identifier type in record 4. The identifier type can define what type of identifier the device associated with this account would use. Record index 10 is the Entity Type Field. This describes is the entity is a Merchant, Individual, or if the device associated with this account is a broadcast only device.

Referring now to FIG. 12 a timing map reference for scanning times and dormant times for devices is shown. In one embodiment, it is desired that the power consumption and scan timing for the devices in a cellular network be reduced. Since the server and the WWAN is involved with all mobile devices, coordination of the broadcasting periods and the searching periods for the short range radios is possible. This can be based on a common reference time such as that provided by most cellular systems, any the time of day clocks inherently within mobile devices. This allows for reduced power consumption and other resource consumption in the devices. If no coordination is achieved, then the short range receivers in each device must be scanning for transmitted identifiers much more often and for longer durations. Utilizing a common timing base, and the central server to notify the devices of a coordination approach for "active times" and "non-active times" and will allow for the devices to minimize the power consumption in the transmission of and scanning for identifiers. This approach also allows for synchronizing the update of each device's identifier (as described previously) to enhance anonymity and security, coordinated with the central server. The "non-active times" may be used as "boundaries" over which the changing identifiers may be updated. This update may be based on either direct communication with the server, or rule and algorithm based updates previously coordinated with the central server so as to minimize server messaging, but allowing the updates to remain synchronized to the server such that the device and the server are always associating the same identifier between them.

As will be recognized by an individual skilled in the area of information technology, the concept of a central server may well be implemented as a collection of servers to allow for load balancing, redundancy, and the like in a manor common to the information technology industry.

FIG. 13 shows a diagram of functional blocks associated with the management of dynamically assigned device identifiers. The Server 1301 has an application agent called an Identifier Manager (1303) which has access to a pool of device identifiers (1302). The Identifier Manager monitors timing information and determines when it is time to update a particular device's identifier. This time may be a regular interval, or a random generated time period by an algorithm such as a pseudo-random sequence generator, or a combination of both. When it is time to update a device identifier, Manager 1303 retrieves a new identifier form the pool 1302. The pool of identifiers may be a list or range of identifiers, or generated algorithmically. The new identifier is stored in the account associated with the entity determined to require updating and a message sent to the device 1305 associated with that account commanding it to update its device identifier with the new one. This message is sent over the WWAN Data network 1304 such as IS-2000, HSPA, GPRS, IS-95, Edge, Wi-Max, and the like. All devices 1305 to 1307 will eventually all be updated in a similar manner. This update process does not disrupt ongoing communication and interaction between devices despite the update as the communications are preformed based on the identity of the entities following the detection of the device identifiers which are no longer utilized. This unique capability allows for the updating process to be implemented and not impact the applications being utilized concurrently.

Other example applications utilizing still other embodiments follow below.

Requiring the brokering of the communication via a central server can also allow a mobile device to receive information associated with a "broadcast only" device, such as in the museum example discussed previously. This is important, as such broadcast devices can enable a vast set of new applications built upon the infrastructure developed in this application, beyond the museum application. Some of these applications may involve an electronic commerce aspect, for example.

Electronic Commerce Applications

Ecommerce Between a Fixed Broadcast Device and a Mobile Device

Football Stadium Example

An embodiment of a transaction model, enabled by the infrastructure described above can be an event such as a concert, or sporting event (particularly when it is an indoor venue where no GPS is available). A number of the broadcast only devices are placed through out the seating areas. The devices are very short range, and only transmit intermittently and as a result may be battery powered and to remain active over a very long time period. Each device can be placed in a known location, in a predicable manner.

An attendee at the event has his or her device enabled with the identifier protocol and other embodiments described above. The device detects a broadcast device, and interacts over the internet with the server via the WWAN connection (as already described above). The server receives an indication of the broadcast device's identifier and the identifier of the account associated with the device which detected the broadcast device. The server retrieves content associated with the service provider's account and provide that content to the application on the requesting mobile device. The content may indicate that the venue has a product delivery service. The user may then press an indication on their device that they would like to see a menu or list of items for sale from the merchant(s) in the venue. The application on the user's device would then allow them to see a menu, for instance, and select items to purchase. The user then would be asked to confirm the purchase. The server would then indicate to the merchant that a user located near a specific broadcast device has ordered something. In this case, it is expected that a delivery fee could also be charged for the enhanced service. The server would facilitate the purchasing of the goods or services from the merchant and payment from customer's account, and provide confirmation to each. Such confirmation can include an electronic receipt provided to the customer, for user upon arrival of the delivery person of the good or service. The customer can then select an indication on their device confirming receipt of the good or service via the mobile device, thereby completing the transfer of funds and the transition. Optionally, the delivery person of the good or service may have an enabled mobile device as well. In this case the identifiers may be detected by the customer's device and reported to the server to confirm that the provider's delivery person was present. Further, the delivery person's device can be able to detect the broadcast device's identifier and reported to the server confirming the delivery person was in the correct area independently. Even further proximity confirmation may be achieved by the customer's device's transmitted identifier being detected by the delivery person's device and reported to the central server further confirming the physical proximity of the parties involved in the transaction. Upon arrival of the delivery person, the customer may be notified that the delivery person is looking for them, and has arrived. These cross confirmations can allow for the central server evidence to justify payments both in completed transactions and in disputed or failed transactions. Further, the delivery person may receive a picture of the requesting customer assisting to identify the customer to whom the food is to be delivered. Once the customer is found, the delivery person can confirm the delivery of the good or service to the customer via the user input on their mobile device, and that confirmation being reported to the central server. The customer can have the option to report confirmation or denial of the reception of the product or service as well, as in the last example.

In another embodiment, the merchant device may be fixed, but have an internet connection (wireless or otherwise). Further, in some embodiments, the merchant may be an automated device such as a vending machine. In such a model, a customer may use their enabled cell phone to purchase an item such as a beverage from the machine without the need to insert currency into the machine. This can be accomplished by the customer's cell phone detecting the vending machine transmission of the identifier or visa-versa. Following the detection of either the customer's identifier by the vending machine, or the customer detecting the vending machine identifier, the respective device notifies the server, which in turn provides notification (assuming the account settings allow for notification) to the potential customer via their device. Assuming the customer selects to purchase an item from the vending machine using their account associated with their device, the customer may be presented a menu as in the example above. The customer may further be presented information to ensure the identity of the vending machine, such as a description of the machine, a machine identification number, or a (most likely) a picture of the machine where it is located. The customer can then confirm this is the machine they are interfacing with, and select to pay via their account. The customer may in one model select the item to dispense by input to their phone, or they may simply select to provide payment to the machine allowing them to make the selection manually as is the typical mode of operation today. The vending machine can then interact with the server via its own internet connection, and participate in the transaction in a manner similar to the mode described above allowing for step by step confirmation as previously described.

Electronic Opinion Polling, Tied to a Known Location.

In a much simpler example, such a capability might be used to tie a survey to a known location in such a way as to provide an e-coupon to the survey taker on their device in return for completion of the survey. Alternatively, this type of interaction can enable a very large crowd to interact with a Jumbo-Tron like display to provide input to polls or to participate in group activities. Users at different locations in a audience may form teams and interact with other teams for group activities.

Other Preferred Embodiments

Applications running on a device may also interact with the server to perform various functions, for example retrieving information associated with an entity or device, by utilizing a detected identifier. Such information may include stored content associated with the entity's account record such as music, pictures, links to social networking sites, instant messaging addresses, advertising content, and even executable scripts or application such as in AJAX. An example of such an application may include the detection of a device's identifier in a fixed location allowing for tour guide like information to be provided for that location.

As the server may be running applications which perform more function than just the retrieval of content, a pre-defined interaction process may also be applied by the server to the devices such as allowing the approval to share private content with the entity associated with the detected device. This process may eventually allow or disallow the sharing of information and to facilitate the interacting with another entity.

As a more complex example, in other embodiments, the devices may utilize the server as a third party to provide for new capabilities such as a secure three way e-commerce transaction between two entities. In this more complex process, the server may require confirmation of each party's identity with visual cross verification of the parties using pictures or other unique identifiers. The server may use this visual cross verification in conjunction with detecting that the individuals are in proximity with each other. The server may verify the proximity using GPS or using the peer to peer detection process in another embodiment. Further, the server may facilitate a process requiring each party to perform a step by step confirmation during the transaction including the stages of: the request for purchase, the payment, the receipt of goods and services, and the providing of payment receipt.

This differs from the approaches employed by prior art location aware mobile social networking techniques in that no GPS is needed to determine when one device is in proximity to another. Many wireless devices in use are not GPS-capable, and even when they are, GPS will often not operate indoors or where the GPS signal is weak. Using a peer to peer detection process to locate nearby devices allows for the operation of proximity detection indoors.

Preferred embodiments can also differ from known peer to peer based social networking in that the information flow between the devices running the applications are over the wide area network via a central server, rather than carried over the peer to peer network itself. An example of this is a service called Flobbi, as discussed previously, where community members can identify each other via Bluetooth transmissions, then interact with chat. The messaging in this case is carried over Bluetooth itself. A distinction from such peer to peer approaches is the use of a central server to "broker" the transactions between peers, enhancing the ability to manage security and information disclosure. Such use allows for the opportunity to customize delivered content to include elements such as advertising or other content customized to the recipient based on additional information such as known personal purchasing history, or interests.

A further distinction of the preferred embodiment is the use of a central server to determine identities of detected peer devices, which additionally allows for secure and fraud resistant application of policies for the disclosure of information and content. An issue with the existing pure peer to peer approaches is that they are not capable of enforcing policy associated with the disclosure of information to unknown entities in a secure and fraud resistant manor. One reason for this is that information related to a user's device must be disclosed in the process of detection in the form of a static identifier. By the nature of the identifier, it must be static or peers would not be able to directly determine the identity of a friend over time with the information stored on their device. By using a central server, the system may coordinate the change of the identifiers from time to time such that the disclosure of an identifier by one device to another does not compromise the identity of the device. In this case the identifier may be assigned from a central server and such server coordinate the identifier's change from time to time.

Reliance on a central server also allows the secure and fraud resistant application of disclosure policy. Such policy might include the verification of the identity of the party to which information (identity and presence for instance) or content (pictures of the account owner) is to be provided. Such verification is performed in an anonymous way such that in the process of verifying information associated with each party, no personal information is disclosed between the parties prior to satisfaction of some pre-set policy such as inclusion on a friend list or belonging to a specific group or organization. Another important policy required for such services would be the determination of any past negative feed back ratings by other past peers for behavior for the particular user to which the information is to be provided. An individual with significant poor ratings having detected a peer, may be denied access to personal information or even notification of arrival of the detected peer based on the server policy setting by the detected peer or the server in general.

A further distinction is to enable electronic payments for individuals who are in close proximity to each other. The central server can act as a third trusted party to help facilitate the electronic transaction between the individuals. Secondly, the server allows for a convenient, electronically secure, personally secure and anonymous method for each of the individuals to specify the party with which they wish to engage in a transaction. Thirdly, participants in a transaction can cross validate the identities of the individuals engaged in the transaction. Finally, because this method is proximity based it will also work indoors or in other situations where GPS location information is not available.

FEATURE SUMMARY OF PREFERRED EMBODIMENTS

1. In a First Embodiment

One device is transmitting a wireless identifier using a wireless protocol capable of peer to peer communication;
The wireless identifier being associated with a specific account on a server connected to the internet;
A second device receiving the wireless identifier
The second device capable of communicating with the server over an internet connection;
The second device requesting information from the service associated with the first identifier
The second device having a second identifier associated with a second account on the server; and/or
The server providing different amounts of information related to the first account based on the parameters associated with one or both of the first and second accounts
The identifiers associated with the accounts being updated such that the identifiers would no longer be recognized as being associated with specific accounts without past or current interaction with the server;
Using one or more of Cellular network timing information, and information form the central server to coordinate the broadcast and search times amongst the devices. (to reduce power and resource consumption); and/or
Data necessary to engage in an E-commerce transaction may be exchanged as well such as the identity verification such as via a picture and/or mutual identifier detection.

2. In a Second Embodiment

A device is capable of operating two wireless protocols simultaneously, utilizing a first wireless protocol in the device to detect the proximity of another wireless device and using the second wireless protocol to communicate with a remote server, where:
  One or more of the devices are mobile devices;
  Where the first wireless protocol is a local, or personal area network wireless protocol such as 802.11, Bluetooth, UWB or other local connectivity protocol;
  Where the first wireless capability used for detecting the presence of another device, or advertising the presence or a device;
Utilizing a wireless wide area data link from one or more of the wireless devices to, optionally:
  Connect to a central server;
  Perform user authorization functions;
  Perform download of information associated with account identifiers utilizing the short range wireless capability;
  Request forwarding of messages/packets to the other active account;
  Utilizing the messaging with a mobile proximity based social networking capability; and optionally,
  The messaging being performed via the WWAN; and/or
  The server providing a centrally assigned user identity, with relationship brokering or identification capability.

3. In Another Embodiment

A central serving capability is provided to mobile devices utilizing a wireless WAN connection to provide and exchange information between one or more application on one or more wireless devices and the central server where
  the information passed to the central server is collected by one wireless device from another wireless device via a separate local wireless reception from the other wireless device;
  the separate local wireless reception from the second wireless device contains information directly assigned by, derived from, or known to the central server associated with the identity of the second wireless device;
  this identity is related to certain information and preferences of an account holder associated with an application operating on the second wireless device;
  the application is operating on both wireless devices;
  the application operating on the first device also provides its own identifying information to the central server as well as detected identifiers from devices with applications on them;
  The central server contains account information registered to the applications running on each wireless device;
  The preferences associated with the account information also contain policies related to the disclosure of one account's stored information to other accounts and hence to their application on their devices;
  These policies including a classification of other accounts each classification having different policies some of these policies being one of:
  no not allow notification of my presence
  allow notification of my presence
  disclose my name/do not disclose my name
  disclose age/do not disclose age
  disclose personal details;
  Where an application running on each device can optionally perform point of sale transitions coordinated via the central server, over the WWAN, utilizing user input on each device as confirmation of successive steps in the transition;
  Further, where at least one of the confirmation steps additionally involves displaying an identifying picture related to one of the devices, on the other device;
  Additionally the server performing an authorization for the transition to a third party;
  Or, optionally, a device is interacting with a point of sale device to associate an itemized list of items with a detected second device;
  The service performing a confirmation with the application on the second device requiring user input that the bill of goods list is correct; and/or
  The server storing the information related to the second devices detected account identity and inventory in a database for later use

4. In Still Other Embodiments, a Device has a Wireless Capability with No WWAN Capability, but Only with the Ability to Broadcast a Unique Identifier, and A central server stores having the broadcast device's details;
And when the first device provides these detail to the server, authorized and current information about the broadcast device are provided to the first wireless device;
Where this information optionally includes advertising information or information related to "e-coupons" for special offers for products or services; and/or Where the content of the e-coupons might be customized based on the identity of the requesting device or account holder;

Where the content is further customized based on other information known by the server related to the user's account; or Where the other information is related to the user's past purchasing practices or previous requests; and/or A mobile device, upon detecting a broadcast device and if enabled to do so, will report that broadcast Id to the server over a WWAN, and retrieve the current content from the server associated with that device and:

Display it to the user on their device; or

Execute instructions associated with the information retrieved from the server.

5. In Still Further Embodiments, a Good or Service Delivery Model Utilizing the Above Described Broadcast Device, is Placed in a Known Location, and Further A mobile device is for detecting the fixed device's identifier via the WPAM/WLAN;

The mobile device reporting this identifier and passing an identifier associated with itself, or the account associated with the user utilizing the device;

The server determining that the detected broadcast device is associated with the broadcast device with a known location;

The server further determining that the identifier is associated with a service, and further associated with an account or that service;

The server retrieving content associated with the service provider's account and providing that content to the application on the requesting mobile device;

Where that content may be a list of items for sale, services for sale, a opinion pole, food menu, or other menu style content which allows for user selection of items, which can be implemented in java code, xml, simple text, or other for example optionally including active code elements;

The application on the mobile device displaying the content to the user display with the itemized list of goods, services, or other selection items;

A user providing selection of one or more of the items, and confirming they wish to purchase said items, and take delivery at or near the location of the fixed broadcast device;

The server facilitating the purchasing of the goods or services from the merchant's account and the customer's account, and providing confirmation to each. Such confirmation including an electronic receipt provided to the customer, for user upon arrival of the deliverer of the good to or service;

The customer confirming receipt of the good or service via the mobile device, thereby completing the transfer of funds and the transition; and/or The deliverer of the good or service optionally having a mobile device and optionally:

such that identifiers from that device may be detected by the customers device and reported to the server to confirm that the provider's delivery person was present;

such that the broadcast devices identifier is detected by the delivery person's mobile device and reported to the server confirming the deliver person was in the correct area such that the customer's device's transmitted identifier is detected by the delivery persons device and reported to the central server further confirming the physical proximity of the parties involved in the transaction; and/or The delivery person confirming the delivery of the good or service to the customer via the user input on their mobile device, and that confirmation being reported to the central server.

6. In Another Embodiment, a Software Program is Arranged to Operate at the Application Layer on a Mobile Device, which Interfaces to a Device Driver Interface Using wi-fi 802.11 to perform a WLAN local connection protocol; or Using Bluetooth to perform the WLAN local connection;

Where the device driver interface is an NDIS driver or the like;

Using 1xEVDO, HSDPA, GPRS, EDGE or the like for a wide area WWAN interface;

The application then providing the reported identifiers to a server, which will make decisions regarding a users interest in these detected identifiers, and policy regard privacy other identifiers;

The decision process optionally based on priority of the identifier, the class an identifier belongs to, a list the identifier is, or is not included on;

Based on the result of the action function,

Sending at least one detected identifier to the network, potentially with additional information from the action function, and retrieving information back from the server related to that identifiers' account information stored on that server;

The server then receiving a request from a device's application, with a detected identifier The server examining both the requesting and the requested identifier's identity and making a policy decision regarding the release of the requested identifiers information related to their account;

The server in some cases providing a continuously or periodically changing account or device identifier to a specific application on a device to enhance the privacy of the identity of that device;

The changing of the identifier may be effected by a rule based generation local to the application, or may be downloaded from the server directly; and/or The update of the identifier being synchronized to such that it is coordinated with predetermined scanning and broadcasting periods allowing for a known update boundary;

7. In Still Another Embodiment, a Method Uses the Mobile Device's Time of Day Derived from the Network or Other Reference for synchronizing a PAN/WLAN discovery and advertisement times to save battery life;

doing the same in a synchronized way among multiple devices;

while coordinating the timing information utilizing the WWAN and a central server available commonly to the devices, such as by Synchronizing identifier transmission timing to save power from WWAN network parameters obtained for the server;

Coordinating any identifier updates to this same timing source; and/or

Using a pool of identifiers available to the central server to assign identifiers to devices changing the identifiers at some time interval derived for the common time reference

8. In Another Embodiment

A central server uses an identity manager to assign identifiers to devices using a WWAN cellular data link, and wherein identifiers are occasionally changed identifiers are assigned from a pool of identifiers available to the servers;

identifiers are used as 48 bit media access control (MAC) addresses of the short range wireless network adapter identifiers are optionally used as an SSID in a MSS in IEEE-802.11 network beacons a BSSID of the IEEE802.11 network adapter;

in a IEEE802.15.1 Inquiry Response Message as the BD_ADDR a device name in a Bluetooth name response packet; or listed in a services list as provided in a LMP_features_req message or LMP_features_req_ext message for a Bluetooth device While this invention has been particularly shown and described with references to example embodiments thereof, it will be understood by those skilled in the art that various changes in form and details may be made therein without departing from the scope of the invention encompassed by the appended claims.

The invention claimed is:

1. A method comprising:

causing processing, at a wireless device, of a first plurality of beacon transmissions received at the wireless device via a short range wireless protocol, each beacon transmission comprising three fields (a) a MAC address, (b) a unique identifier, wherein the unique identifier of each respective beacon transmission is a numeric value, and (c) a beacon service identifier, wherein the beacon service identifier of each respective beacon transmission identifies a wireless beacon service in which the unique identifier is relevant to stored information relating to an entity or object associated with a transmitter of a respective beacon transmission;

causing a transfer of the stored information between the wireless device and one or more servers via a second wireless protocol, wherein at least a portion of the stored information relates to a particular entity or object associated with a first unique identifier, and wherein the second wireless protocol is different from the short range wireless protocol;

causing selection of one or more of the unique identifiers from the first plurality of beacon transmissions, by filtering the beacon transmissions which include a particular beacon service identifier; and taking first further action relating to the stored information, if the first unique identifier is present among the selected one or more unique identifiers.

2. The method of claim 1, wherein the processing of the first plurality of beacon transmissions occurs in a first time period, and wherein the method further comprises, during a second time period:

causing processing, at the wireless device, of a second plurality of beacon transmissions received at the wireless device via the short range wireless protocol, each of the second plurality of beacon transmissions comprising three fields (a) a MAC address, (b) a unique identifier, wherein the unique identifier of each respective beacon transmission is a numeric value, and (c) a beacon service identifier, wherein the beacon service identifier of each respective beacon transmission identifies a wireless beacon service in which the unique identifier is relevant to the stored information relating to an entity or object associated with a transmitter of a respective beacon transmission;

causing selection of one or more of the unique identifiers from the second plurality of beacon transmissions, by filtering the beacon transmissions which include the same particular beacon service identifier; and taking second further action relating to the stored information, if a second unique identifier is present among the one or more unique identifiers selected from the second plurality of beacon transmissions, wherein the first unique identifier and the second unique identifier are both associated with the same particular entity or object, and wherein the second unique identifier is not equal to the first unique identifier, and further wherein the received beacon transmissions including the first and second unique identifiers are received from a same transmitting device.

3. The method of claim 2 wherein the MAC address received in a beacon transmission including the second unique identifier is different from the MAC address received in a beacon transmission including the first unique identifier, but each such beacon transmission includes the same particular beacon service identifier, and wherein a plurality of beacon transmissions including the particular beacon service identifier and the first unique identifier are received in the first time period, and no beacon transmissions including the same particular beacon service identifier and the second unique identifier are received in the first time period.

4. The method of claim 3 wherein the second further action is based upon a function currently being performed on a device associated with the wireless beacon service.

5. The method of claim 4 wherein the function is related to a current phone call.

6. The method of claim 2 wherein the first or the second further action is related to receiving advertising information for presentation to a user of the wireless device, based upon the first or the second unique identifier, or information derived from the first or second unique identifier.

7. The method of claim 2 wherein one or more of the first further action and the second further action includes receiving content from a server based upon information derived from either the first unique identifier or the second unique identifier.

8. The method of claim 2, wherein the first or second further action includes sending a message to another device associated with an account related to the first and the second unique identifiers.

9. The method of claim 2 wherein following the taking of the first or second further action, a server associated with an account for a user of the wireless device performs a step of sending an email message to an email address associated with the account for the user, the email message relating to a physical object in proximity to the transmitter of the respective beacon transmission.

10. The method of claim 2 wherein the second further action includes preventing sending of the second unique identifier or information derived from the second unique identifier by the wireless device to at least one of the one or more servers.

11. The method of claim 2 wherein the first further action comprises: determining, based upon at least a portion of the stored information, that at least one beacon transmitter is associated with a predetermined location.

12. The method of claim 2 wherein the taking first further action further includes causing the wireless device, to:
send the first unique identifier or information derived from the first unique identifier to at least one of the one or more servers, and
receive the stored information in response.

13. The method of claim 2 wherein the stored information is received at the wireless device from at least one of the one or more servers prior to the taking of the first further action.

14. The method of claim 2 wherein the stored information is received at the wireless device from at least one of the one or more servers prior to performing the second further action.

15. The method of claim 1 further comprising:
using the stored information to determine if the first unique identifier is present among the first selected one or more unique identifiers.

16. The method of claim 2 wherein all beacon transmitter devices participating in the particular wireless beacon service have the same particular beacon service identifier.

17. The method of claim 2 wherein the second further action comprises:
determining, based upon at least a portion of the stored information, that at least one beacon transmitter is associated with a predetermined location.

18. The method of claim 17 wherein the steps performed at the wireless device are performed, at least in part, as a result of an application program executing on the wireless device.

19. The method of claim 2 wherein the second further action is related to either a product tied to a location or an advertisement tied to a location.

20. The method of claim 1 wherein the first further action includes determining an address or location associated with the wireless device based at least in part upon the first unique identifier being associated with a pre-determined location, and wherein the wireless device is located where a GPS signal is not available.

21. The method of claim 2 wherein the second further action includes determining an address or location associated with the wireless device based at least in part upon the second unique identifier being associated with a pre-determined location, wherein the wireless device is located where a GPS signal is not available.

22. The method of claim 2 wherein the second further action includes allowing a user associated with the wireless device to be provided access to an object or device associated with the wireless beacon service.

23. The method of claim 3 wherein the taking second further action additionally comprises:
controlling further communications between the wireless device and at least one device or server associated with an entity in proximity to the wireless device, and wherein the stored information includes contact information of the entity in proximity utilized to determine the presence of the second unique identifier prior to taking the second further action.

24. The method of claim 17 further comprising:
using the stored information to determine if the second unique identifier is present among the selected one or more of the unique identifiers from the second plurality of beacon transmissions.

25. The method of claim 3 wherein the MAC address of the selected beacon transmissions having the particular beacon service identifier and the second unique identifier is a randomly generated 48 bit number matching a format of a Bluetooth BD_ADDR, and is not directly usable by the wireless device to establish a connection with the transmitter of that beacon transmission via the short range wireless protocol.

26. The method of claim 1 wherein the first further action is related to receiving advertising information for presentation to a user of the wireless device, based upon the first unique identifier, or information derived from the first unique identifier.

27. The method of claim 1 wherein the first further action includes receiving content from a server based upon information derived from the first unique identifier.

28. The method of claim 1 wherein following the taking of the first further action, a server associated with an account for a user of the wireless device performs a step of sending an email message to an email address associated with the account for the user as a result of the first further action.

29. The method of claim 1 wherein the first further action comprises:
determining that at least one beacon transmitter is associated with a predetermined location.

30. The method of claim 3 wherein the second further action comprises:
causing to send, at the wireless device, to a server associated with a particular beacon service identified by the particular beacon service identifier: a) the second unique identifier or information derived from the second unique identifier and b) a location associated with the wireless device, so as to allow an entity associated the same transmitting device to be informed by the server, of the location associated with detection of beacon transmissions from the same transmitting device.

31. The method of claim 1 wherein the first further action is related to either a product tied to a location or an advertisement tied to a location.

32. The method of claim 3 wherein the taking second further action additionally comprises:
controlling further communications between the wireless device and at least one device or server associated with an entity or object in proximity to the wireless device.

33. The method of claim 2 further comprising:
using the stored information to determine if the second unique identifier is present among the selected one or more of the unique identifiers from the second plurality of beacon transmissions.

34. A mobile wireless device comprising:
one or more radios for providing reception and transmission for each of a Bluetooth wireless protocol and a second wireless protocol;
one or more processors; and
one or more memory devices coupled to the one or more processors, the one or more memory devices storing a set of instructions that when executed by the one or more processors cause the one or more processors to perform operations including:
receiving from a beacon transmitter, using the Bluetooth wireless protocol, a first plurality of beacon transmissions during a first time period, each of the beacon transmissions including (a) a MAC address, (b) a unique identifier, wherein the unique identifier of each respective beacon transmission is a numeric value, and (c) a beacon service identifier, wherein the beacon service identifier of each respective beacon transmission identifies a wireless beacon service in which the unique identifier is relevant to stored information relating to an entity or object associated with a transmitter of a respective beacon transmission;

transferring, between the wireless device and one or more servers via the second wireless protocol, stored information related to an entity or object associated with a first unique identifier;

selecting one or more unique identifiers from the first plurality of beacon transmissions, by filtering the beacon transmissions which include a particular beacon service identifier;

taking first further action relating to the stored information, if the first unique identifier is present among the selected one or more unique identifiers;

receiving, by the wireless device, using the Bluetooth wireless protocol, during a second time period, a second plurality of beacon transmissions, each of the second plurality of beacon transmissions comprising three fields (a) a MAC address, (b) a unique identifier, wherein the unique identifier of each respective beacon transmission is a numeric value, and (c) the beacon service identifier, wherein the beacon service identifier of each respective beacon transmission identifies a wireless beacon service in which the unique identifier is relevant to the stored information relating to an entity or object associated with a transmitter of a respective beacon transmission;

selecting one or more of the unique identifiers from the second plurality of beacon transmissions, by filtering the beacon transmissions which include the same particular beacon service identifier indicating that a particular received beacon transmission is associated with the same particular wireless beacon service;

taking second further action relating to the stored information, if a second unique identifier is present among the one or more unique identifiers selected from the second plurality of beacon transmissions, wherein the second unique identifier is associated with the same entity or object, and wherein the second unique identifier is not equal to the first unique identifier, and further wherein the received beacon transmissions including the first and second unique identifiers are received from a same transmitting device; and wherein the MAC address received in a beacon transmission including the second unique identifier is different from the MAC address received in a beacon transmission including the first unique identifier, but each such beacon transmission includes the same particular beacon service identifier.

35. A computer program product for installation in a non-volatile memory in a wireless device, the computer program product comprising computer program instructions that, when read from the non-volatile memory, and then executed by one or more processors in the wireless device, cause the wireless device to:

process a first plurality of beacon transmissions, received at the wireless device via a Bluetooth wireless protocol, each beacon transmission comprising three fields (a) a MAC address, (b) a unique identifier, wherein the unique identifier of each respective beacon transmission is a numeric value, and (c) a beacon service identifier, wherein the beacon service identifier of each respective beacon transmission identifies a wireless beacon service in which the unique identifier is relevant to stored information relating to an entity or object associated with a transmitter of a respective beacon transmission;

transfer stored information between one or more servers to the wireless device via a second wireless protocol, wherein the stored information relates to an entity or object associated with a first unique identifier, and wherein the second wireless protocol is different from the Bluetooth wireless protocol;

select one or more of the unique identifiers from the first plurality of beacon transmissions, by filtering the beacon transmissions which include a particular beacon service identifier; and perform a first further action, the first further action relating to the stored information, if the first unique identifier is present among the selected one or more unique identifiers.

36. The computer program product of claim 35 wherein the computer program instructions, when executed by the one or more processors in the wireless device, cause the wireless device to:

during a first time period:
process the first plurality of beacon transmissions in the first time period, and during a second time period:
process a second plurality of beacon transmissions, received at the wireless device via the Bluetooth wireless protocol, each beacon transmission comprising three fields (a) a MAC address, (b) a unique identifier, wherein the unique identifier of each respective beacon transmission is a numeric value, and (c) a beacon service identifier, wherein the beacon service identifier of each respective beacon transmission identifies a wireless beacon service in which the unique identifier is relevant to the stored information relating to an entity or object associated with a transmitter of a respective beacon transmission;

select one or more of the unique identifiers from the second plurality of beacon transmissions, by filtering the beacon transmissions which include the same particular beacon service identifier; and perform a second further action relating to the stored information, if a second unique identifier is present among the one or more unique identifiers selected from the second plurality of beacon transmissions, wherein the first unique identifier and the second unique identifier are both associated with the same particular entity or object, and wherein the second unique identifier is not equal to the first unique identifier, and further wherein the received beacon transmissions including the first and second unique identifiers are received from a same transmitting device.

37. The mobile wireless device of claim 34 wherein a plurality of beacon transmissions including the particular beacon service identifier and the first unique identifier are received in the first time period, and no beacon transmissions including the same particular beacon service identifier and the second unique identifier are received in the first time period.

38. The mobile wireless device of claim 37 wherein the second further action is based upon a function currently being performed on a device associated with the wireless beacon service.

39. The mobile wireless device of claim 38 wherein the function is related to a current phone call.

40. The mobile wireless device of claim 37 wherein one or more of the first further action and the second further action includes receiving content from a server based upon information derived from either the first unique identifier or the second unique identifier.

41. The mobile wireless device of claim 37, wherein the first or second further action includes sending a message to another device associated with an account related to the first and the second unique identifiers.

42. The mobile wireless device of claim 37 wherein following the taking of the first or second further action, a server associated with an account for a user of the wireless device performs a step of sending an email message to an email address associated with the account for the user, the email message relating to the particular entity or object.

43. The mobile wireless device of claim 37 wherein the first further action comprises: determining, based upon at least a portion of the stored information, that at least one beacon transmitter is associated with a predetermined location.

44. The mobile wireless device of claim 37 wherein the taking first further action further includes causing the wireless device, to:
send the first unique identifier or information derived from the first unique identifier to at least one of the one or more servers, and
receive the stored information in response.

45. The mobile wireless device of claim 37 wherein the stored information is received at the wireless device from at least one of the one or more servers prior to the taking of the first further action.

46. The mobile wireless device of claim 39 wherein the stored information is received at the wireless device from at least one of the one or more servers prior to performing one or more of the first and the second further action.

47. The mobile wireless device of claim 45 further comprising:
using the stored information to determine if the first unique identifier is present among the first selected one or more unique identifiers.

48. The mobile wireless device of claim 37 wherein all beacon transmitter devices participating in the particular wireless beacon service have the same particular beacon service identifier.

49. The mobile wireless device of claim 37 wherein the second further action comprises:
determining, based upon at least a portion of the stored information, that the beacon transmitter is associated with a predetermined location.

50. The mobile wireless device of claim 37 wherein the first further action includes determining an address or location associated with the wireless device based at least in part upon the first unique identifier being associated with a pre-determined location, and wherein the wireless device is located where a GPS signal is not available.

51. The mobile wireless device of claim 37 wherein the second further action includes determining an address or location associated with the wireless device based at least in part upon the second unique identifier being associated with a pre- determined location, wherein the wireless device is located where a GPS signal is not available.

52. The mobile wireless device of claim 37 wherein the second further action includes allowing a user associated with the wireless device to be provided access to an object or device associated with the wireless beacon service.

53. The mobile wireless device of claim 37 wherein the taking second further action additionally comprises:
controlling further communications between the wireless device and at least one device or server associated with an entity in proximity to the wireless device, and wherein the stored information includes contact information of the entity in proximity utilized to determine the presence of the second unique identifier prior to taking the second further action.

54. The mobile wireless device of claim 37 further comprising:
using the stored information to determine if the second unique identifier is present among the selected one or more of the unique identifiers from the second plurality of beacon transmissions.

55. The mobile wireless device of claim 53 wherein the MAC address of the selected beacon transmissions having the particular beacon service identifier and the second unique identifier is a randomly generated 48 bit number matching a format of a Bluetooth BD ADDR, and is not directly usable by the wireless device to establish a connection with the transmitter of that beacon transmission via the short range Bluetooth wireless protocol.

56. The mobile wireless device of claim 37 wherein the second further action comprises:
causing to send, at the wireless device, to a server associated with a particular beacon service identified by the particular beacon service identifier: a) the second unique identifier or information derived from the second unique identifier and b) a location associated with the wireless device, so as to allow an entity associated the same transmitting device to be informed by the server, of the location associated with detection of beacon transmissions from the same transmitting device.

57. The mobile wireless device of claim 37 wherein the taking second further action additionally comprises:
controlling further communications between the wireless device and at least one device or server associated with an entity or object in proximity to the wireless device.

58. The mobile wireless device of claim 37 further comprising:
using the stored information to determine if the second unique identifier is present among the selected one or more of the unique identifiers from the second plurality of beacon transmissions.

59. The mobile wireless device of claim 53 wherein the stored information includes an image of the entity in proximity, wherein the image is displayed on a screen of the wireless device as part of the second further action, and wherein the wireless device requires input from a user of the second wireless device selecting the image of the entity as part of the controlling of the further communications.

60. The computer program product of claim 36 wherein the MAC address received in a beacon transmission including the second unique identifier is different from the MAC address received in a beacon transmission including the first unique identifier, but each such beacon transmission includes the same particular beacon service identifier, and wherein a plurality of beacon transmissions including the particular beacon service identifier and the first unique identifier are received in the first time period, and no beacon transmissions including the same particular beacon service identifier and the second unique identifier are received in the first time period.

61. The computer program product of claim 60 wherein the second further action is based upon a function currently being performed on a device associated with the wireless beacon service.

62. The computer program product of claim 61 wherein the function is related to a current phone call.

63. The computer program product of claim 60 wherein one or more of the first further action and the second further action includes receiving content from a server based upon information derived from either the first unique identifier or the second unique identifier.

64. The computer program product of claim 60, wherein the first or second further action includes sending a message to another device associated with an account related to the first and the second unique identifiers.

65. The computer program product of claim 60 wherein following the taking of the first or second further action, a server associated with an account for a user of the wireless device performs a step of sending an email message to an email address associated with the account for the user, the email message relating to the particular entity or object.

66. The computer program product of claim 60 wherein the first further action comprises: determining, based upon at least a portion of the stored information, that at least one beacon transmitter is associated with a predetermined location.

67. The computer program product of claim 60 wherein the taking first further action further includes causing the wireless device, to:
  send the first unique identifier or information derived from the first unique identifier to at least one of the one or more servers, and
  receive the stored information in response.

68. The computer program product of claim 60 wherein the stored information is received at the wireless device from at least one of the one or more servers prior to the taking of the first further action.

69. The computer program product of claim 62 wherein the stored information is received at the wireless device from at least one of the one or more servers prior to performing one or more of the first and the second further action.

70. The computer program product of claim 68 further comprising:
  using the stored information to determine if the first unique identifier is present among the first selected one or more unique identifiers.

71. The computer program product of claim 60 wherein all beacon transmitter devices participating in the particular wireless beacon service have the same particular beacon service identifier.

72. The computer program product of claim 60 wherein the second further action comprises:
  determining, based upon at least a portion of the stored information, that the beacon transmitter is associated with a predetermined location.

73. The computer program product of claim 60 wherein the second further action is related to either a product tied to a location or an advertisement tied to a location.

74. The computer program product of claim 60 wherein the first further action includes determining an address or location associated with the wireless device based at least in part upon the first unique identifier being associated with a pre-determined location, and wherein the wireless device is located where a GPS signal is not available.

75. The computer program product of claim 60 wherein the second further action includes determining an address or location associated with the wireless device based at least in part upon the second unique identifier being associated with a pre-determined location, wherein the wireless device is located where a GPS signal is not available.

76. The computer program product of claim 60 wherein the second further action includes allowing a user associated with the wireless device to be provided access to an object or device associated with the wireless beacon service.

77. The computer program product of claim 60 wherein the taking second further action additionally comprises:
  controlling further communications between the wireless device and at least one device or server associated with an entity in proximity to the wireless device, and wherein the stored information includes contact information of the entity in proximity utilized to determine the presence of the second unique identifier prior to taking the second further action.

78. The computer program product of claim 77 wherein the MAC address of the selected beacon transmissions having the particular beacon service identifier and the second unique identifier is a randomly generated 48 bit number matching a format of a Bluetooth BD_ADDR, and is not directly usable by the wireless device to establish a connection with the transmitter of that beacon transmission via the Bluetooth wireless protocol.

79. The computer program product of claim 60 further comprising:
  using the stored information to determine if the second unique identifier is present among the selected one or more of the unique identifiers from the second plurality of beacon transmissions.

80. The computer program product of claim 60 wherein the first further action is related to receiving advertising information for presentation to a user of the wireless device, based upon the first unique identifier, or information derived from the first unique identifier.

81. The computer program product of claim 60 wherein the first further action includes receiving content from a server based upon information derived from the first unique identifier.

82. The computer program product of claim 60 wherein following the taking of the first further action, a server associated with an account for a user of the wireless device performs a step of sending an email message to an email address associated with the account for the user as a result of the first further action.

83. The computer program product of claim 60 wherein the first further action comprises: determining that at least one beacon transmitter is associated with a predetermined location.

84. The computer program product of claim 60 wherein the second further action comprises:
  causing to send, at the wireless device, to a server associated with a particular beacon service identified by the particular beacon service identifier: a) the second unique identifier or information derived from the second unique identifier and b) a location associated with the wireless device, so as to allow an entity associated the same transmitting device to be informed by the server, of the location associated with detection of beacon transmissions from the same transmitting device.

85. The computer program product of claim 60 wherein the taking second further action additionally comprises:
  controlling further communications between the wireless device and at least one device or server associated with an entity or object in proximity to the wireless device.

86. The computer program product of claim 60 further comprising:
    using the stored information to determine if the second unique identifier is present among the selected one or more of the unique identifiers from the second plurality of beacon transmissions.

87. The computer program product of claim 78 wherein the stored information includes an image of the entity in proximity, wherein the image is displayed on a screen of the wireless device as part of the second further action, and wherein the wireless device requires input from a user of the wireless device selecting the image of the entity as part of the controlling of the further communications.

\* \* \* \* \*